United States Patent
Dessureaux et al.

(10) Patent No.: US 12,254,578 B1
(45) Date of Patent: Mar. 18, 2025

(54) DEVICE INTEGRATION IN AUGMENTED REALITY ENVIRONMENT

(71) Applicant: Amazon Technologies, Inc., Seattle, WA (US)

(72) Inventors: Alain Dessureaux, Orange, CA (US); Farah Lynn Houston, Seattle, WA (US); Jason W. Bay, Bellevue, WA (US); David Chiapperino, Seattle, WA (US); J. C. Connors, Redmond, WA (US); Paul Andrew Larpenteur, Bothell, WA (US); Johannes Seifert, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 213 days.

(21) Appl. No.: 17/853,521

(22) Filed: Jun. 29, 2022

(51) Int. Cl.
  *G06T 19/00* (2011.01)
  *G05B 15/02* (2006.01)
  *G06F 3/01* (2006.01)

(52) U.S. Cl.
  CPC ............ *G06T 19/006* (2013.01); *G05B 15/02* (2013.01); *G06F 3/011* (2013.01); *G05B 2219/25011* (2013.01)

(58) Field of Classification Search
  CPC .................. G06T 19/006; G05B 15/02; G05B 2219/25011; G06F 3/011
  USPC ........................................................ 345/633
  See application file for complete search history.

(56) References Cited

U.S. PATENT DOCUMENTS

| | | | |
|---|---|---|---|
| 9,462,262 B1* | 10/2016 | Worley, III | H04N 13/363 |
| 2014/0247525 A1* | 9/2014 | Parks | H03K 19/1736 |
| | | | 326/101 |
| 2016/0274762 A1* | 9/2016 | Lopez | G06T 19/006 |
| 2018/0095605 A1* | 4/2018 | Flores | G06F 3/011 |
| 2018/0204385 A1* | 7/2018 | Sarangdhar | H04L 12/282 |
| 2019/0114061 A1* | 4/2019 | Daniels | G06F 3/011 |

* cited by examiner

*Primary Examiner* — Jin Ge
(74) *Attorney, Agent, or Firm* — Nicholson De Vos Webster & Elliott LLP

(57) ABSTRACT

Systems and methods for device integration in augmented reality environments are disclosed. For example, prior to an AR session being initiated, smart devices within a physical environment where the AR session is to be utilized may be identified and selected based on the functionality of the smart devices and the capabilities of an AR application associated with the AR session. Location information about the smart devices may also be determined and this information may be utilized to generate configuration data, which may be used by the AR application to cause device state transitions on the smart devices in response to events that occur in an AR environment of the AR session.

20 Claims, 14 Drawing Sheets

DEVICE INTEGRATION IN AUGMENTED REALITY ENVIRONMENT

BACKGROUND

Internet-of-things devices have become more common in homes and other environments. Some of these devices are operated pursuant to certain rules and/or when a user requests device operation. Described herein are improvements in technology and solutions to technical problems that can be used to, among other things, enhance use of smart home devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
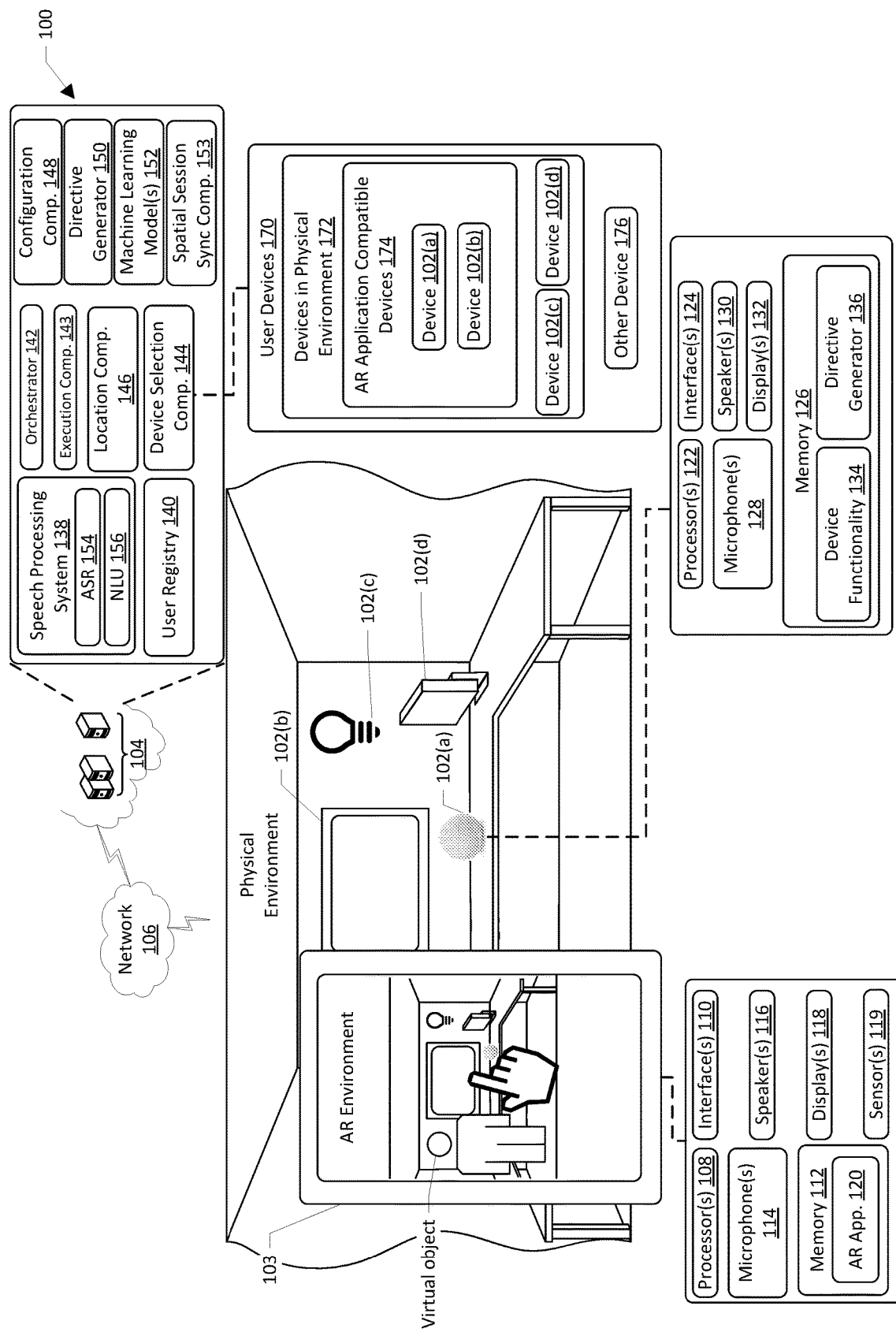
FIG. 1 illustrates a schematic diagram of an example physical environment for device integration with augmented reality (AR) environments.

Systems and methods for device integration with AR environments are disclosed. Take, for example, a physical environment (such as a home, hotel, vehicle, office, store, restaurant, or other space) where one or more users may be present. The physical environments may include one or more electronic devices that may be utilized by the users or may otherwise be utilized to detect conditions associated with the physical environments. For example, the electronic devices may include voice interface devices (e.g., smart speaker devices, mobile phones, tablets, personal computers, televisions, appliances like refrigerators and microwaves, etc.), graphical interface devices (e.g., televisions, set top boxes, virtual/augmented reality headsets, etc.), wearable devices (e.g., smart watch, earbuds, healthcare devices), transportation devices (e.g., cars, bicycles, scooters, etc.), televisions and/or monitors, smart thermostats, security systems (including motion sensors and open/close sensors, including sensors that indicate whether a security system is armed, disarmed, or in a "hoe mode), smart cameras (e.g., home security cameras), and/or touch interface devices (tablets, phones, steering wheels, laptops, kiosks, billboard, other devices with buttons, etc.), etc. These electronic devices may be situated in a home, in a place of business, healthcare facility (e.g., hospital, doctor's office, pharmacy, etc.), in a vehicle (e.g., airplane, truck, car, bus, etc.) in a public forum (e.g., shopping center, store, etc.), and/or at a hotel/quasi-public area, for example. As used herein, a "user device" may be a device that is held, worn, or otherwise is utilized by a given user.

Some of the devices may be described as "smart home devices," or otherwise are devices that are configured to perform a certain task and may be controlled by other devices such as from a user's phone, a voice interface device, etc. By way of example, the devices may include a smart light, a smart plugin, a smart speaker, a smart television, a smart door lock, a smart doorbell, etc. Generally, these devices may be controlled to change device states of the devices, such as transitioning a smart light from an on state to an off state, or from a white light state to a pink light state, etc. While users may find great benefit in operation of these devices in a given physical environment, use of these devices in an AR environment when an AR session is occurring may provide additional benefits.

For example, a user may have a user device with an AR application installed thereon or otherwise may have access to an AR application that is not necessarily stored on the user device. In some examples, AR as described herein may include virtual reality (VR), extended reality (XR), mixed reality (MR), and/or other augmentations to reality as perceived by a user. In other examples specifically noted herein, AR may be distinct from some or all of VR, XR, MR, and/or other augmentations to reality as perceived by the user. The user may provide user input to the user device indicating an intent to initiate an AR application. The user device may communicate with one or more other devices, which may be remote from the user device, to initiate an orchestration session and cause the user device to display the AR environment on a display of the user device. In other examples, the orchestration session may be initiated from a voice interface device or other device in the physical environment and the user device may be associated with a given orchestration session using a link, code, or otherwise. Generally, the user would view the AR environment by moving the user device around a given physical environment, and a camera of the user device would capture images of the physical environment and display those images, typically in a live-feed manner, on the display of the device. In addition, one or more virtual objects may be presented on the display. The images of the physical environment along with the virtual objects together may form the AR environment that the user may view using the display of the user device. In some AR applications, the displayed virtual objects may be based on locations of physical objects in the physical environment, such as when a virtual person is displayed at a location that corresponds to a floor portion of the physical environment. However, integration of various devices within the physical environment with the AR environment such that those devices can be utilized during the AR session may be desired. Additionally, given the vast differences among environments and devices that may be situated in those environments, techniques to dynamically setup devices and applications to be utilized during a given AR session may be desired.

To do so, in some examples, an orchestrator of a given system may receive an indication that a request to initiate an orchestration session has been received in association with a given user device. Based at least in part on receiving the request, the orchestrator may query one or more datastores to determine whether an orchestration session has been utilized in association with the user device in the past. In examples where such an orchestration session has not occurred, the orchestrator may initiate a process of determining which devices are physically present in the physical environment, which devices may be utilized in association with a given AR application, locations of such devices in association with the user device and/or with each other, orientation of devices in instances where such devices have screens and/or cameras, device capabilities including for example actions that the devices are configured to take and/or which applications the devices are compatible with, and what data is to be sent to the AR application to enable the AR application to utilize the selected devices during a given AR session.

To start, the orchestrator may query a device selection component of the system. The device selection component may be configured to determine what devices are physically present in the physical environment and can be utilized during AR sessions. In examples, the device selection component may receive an identifier of the user device, an identifier of a companion application that is installed on the user device, identifiers of other devices such as voice interface devices that are in short-range communication with the user device, an identifier of a wireless network identifier currently associated with the user device, and/or other identification data that the device selection component may utilize to determine what environment the user device is currently situated in. The device selection component may then utilize this identifying information to determine devices that are associated with user account data for the physical environment. In some examples, device address data may be utilized to identify a location of devices, which may be used to determine which devices are associated with a physical environment. Take, for example, a home that has multiple smart lights, multiple smart speakers, televisions, appliances, and other devices. Each of these devices may have been previously associated with user account data, such as by wireless discovery of such devices, control of such devices using voice input and/or input to a graphical user interface of a user device, etc. The device selection component may identify these devices from the user account data and determine that such devices are to be associated with the physical environment for use during an AR session.

In other examples, additional operations may be performed to determine which of the devices associated with the user account data are to be considered candidate devices for an orchestration session. For example, environmental data may be received from the user device and/or other devices in the physical environment that may indicate which room or other portion of a physical environment the user device is situated in when the request to initiate the orchestration session is received. By way of example, the user device may be situated in a living room of a physical environment and the living room may include only a portion of the devices associated with the user account data. The environmental data may be any data that may be utilized to detect where the user device is situated, but by way of example may include global positioning data, received signal strength indicator (RSSI) data, image data that is analyzed such as via computer vision processing, (e.g., collected by the user device to identify devices) etc. The user account data itself may also be utilized to identify devices associated with a given room or other portion of the physical environment. For example, if the device selection component determines that the user device is located in a living room of the physical environment, device naming indicators, device group names, device affinity data, and/or other data showing prior interactions of the various devices may be utilized to determine what other devices are likely situated in the living room.

The device selection component may then utilize these candidate devices to determine a subset of the candidate devices that may be utilized by the AR application at issue during an AR session. For example, one or more AR applications may be utilized by the user device. Example AR applications may include AR applications associated with games, learning systems, experiential systems, etc. Across AR applications, differing levels of AR functionality may be developed and that AR functionality may limit the types and/or number of devices that can be used during an AR session. For example, a given AR application may be configured to utilize light-emitting devices such as smart lights, but may not be configured to utilize image-output devices and/or audio-output devices. In other examples, the AR application may be configured to utilize some or all types of such devices. Characteristics data from the AR application may be received that indicates the configuration of the AR application, and this characteristics data may be utilized by the device selection component to determine a subset of the candidate devices that may be utilized during an AR session with the AR application.

In addition to determining the devices that may be utilized, a location component of the system may be configured to determine locations of one or more of the subset of devices relative to each other and/or to the user device at issue. For example, a number of techniques may be utilized to determine device locations relative to other devices in the physical environment. For example, RSSI data may be queried from one or more of the devices indicating signal strength as between any two devices. Increased signal strength may indicate devices are closer to each other than decreased signal strength. Additionally, when a voice interface device is situated in the physical environment, beamforming or other microphone-based techniques may be utilized to detect an orientation of a given device from the voice interface device. Furthermore, when one or more of the devices includes a camera, image data from the camera and computer vision techniques may be utilized to detect item location and orientation. It should be understood that the use of image data from device cameras is only be performed when user consent to do so is provided. Additionally, when one or more of the devices includes radar-based technology, such as ultrasonic technology, this technology and similar depth and range finding technology may be employed to detect location and orientation of devices in the physical environment. It should also be understood that when the term "image data" is utilized, the image data may include a single frame or image and/or may continue multiple frames or images in a video format as well as, in some examples, other types of content data such as audio data accompanying the image data. At this point in the process, in examples, the device selection component may select a subset of devices that are within a given space and/or bounded area based at least in part on the location data.

Once the subset of devices is determined and the location data described herein is generated, a configuration component of the system may generate configuration data. The configuration data may indicate the subset of devices, device types of those devices, device capabilities, one or more applications utilized to control such devices, and communication data that may be utilized by the AR application to interface with the system to cause device state transitions when desired by the AR application. This communication data may include one or more application programming interfaces (APIs) and/or other information that may be utilized by the AR application to request the device state transitions to occur. Additionally, the configuration data may include the location data, which may be formatted such that the AR application can determine when interactions in the AR environment correspond to the locations of the devices at issue. Some or all of this configuration data may be utilized by the AR application to determine when and how to utilize the devices in the physical environment during an AR session. By so doing, the devices in the physical environment may be setup for use by the AR application.

In use, the AR application may cause an AR environment to be displayed on the user device. Additionally, one or more interactions with the AR environment may occur during a given AR session. The interactions may be based at least in part on user input, such as a user touching the display of the user device, the user moving a field of view of the camera of the user device, a storyline and/or progression of the AR session, etc. Utilizing the configuration data, the AR application and/or the orchestrator of the system may determine that certain interactions with the AR environment are associated with control of one or more of the devices in the physical environment. For example, a given interaction may cause a light-emitting device to transition states, such as from an on state to an off state, vice versa, performance of a color change, performance of a brightness change, etc. In another example, a given interaction may cause an audio-output device to transition states, such as from an off state to a state where the device outputs certain audio, increasing or decreasing of volume, etc. In another example, a given interaction may cause an image-output device to transition states, such as a state transition that causes certain images to be displayed, causes images to cease being displayed, etc. In some examples, the devices at issue may be multi-modal or otherwise may include multiple types of the functionality described herein, and some or all of these functionalities may be utilized in response to a given interaction with the AR environment. Other example device state changes may be causing a door lock to lock or unlock, a garage door to open or close, a thermostat to change a temperature in the physical environment, an appliance such as an oven to turn on or off, etc.

In addition to the above, specific continuing interactions between the user device and a device in the physical environment, such as an image-output device may be possible given the techniques described herein. As an example, the AR environment as displayed on the user device may include a virtual object, such as a rope. The image-output device may present an image of an object, such as a key, to be acquired by the virtual rope displayed in the AR environment. The user may provide user input to the user device to "flick" the rope toward the physical location of the image-output device. The user device and the image-output device may send and receive data with each other or through an intermediate device to cause display of the rope to occur on the image-output device. Depending on the user input, the rope may "lasso" or otherwise interact with the object displayed on the image-output device. The user may then provide user input to the user device to "pull" the rope back to the user device, and as the user input is provided, the image-output device may display images depicting the rope being pulled back to the user device with the virtual object, here the key. Other forms of image transfer and interaction between the user device and other devices in the physical environment are also disclosed herein.

Additionally, in certain examples, a given AR session may include more than one user and more than one user device. The system described herein may be configured to synchronize the AR session at issue with the multiple user devices such that each user device displays the AR environment from that user device's perspective. In this example, while a certain user device may not generally have access to control of devices in the physical environment, such as when a guest is present in the physical environment and would not typically be permitted to control the smart lights in that environment with the user device, execution of the AR session may allow those user devices to interact with the AR environment, and those interactions may cause the device state transitions of the physical devices as described herein.

Furthermore, the operations described herein may be performed utilizing machine learning techniques. For example, a machine learning model may be generated and configured to determine, by way of example, which devices to select, device locations, what configuration data to generate, etc. A training dataset may be generated that indicates how outcomes of the machine learning model compare to known results. This training dataset may be utilized to generate a trained machine learning model configured to make some or all of the determinations described herein.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for device integration with augmented reality environments. The system 100 may include, for example, one or more devices 102(a)-(d). In certain examples, the devices 102(a)-(d), 103 may be a voice-enabled device (e.g., smart speaker devices, mobile phones, tablets, personal computers, etc.), a video interface device (e.g., televisions, set top boxes, virtual/augmented reality headsets, etc.), and/or a touch interface device (tablets, phones, laptops, kiosks, billboard, etc.). In examples, the devices 102(a)-(d)

may be situated in a home, a place a business, healthcare facility (e.g., hospital, doctor's office, pharmacy, etc.), in vehicle (e.g., airplane, truck, car, bus, etc.), and/or in a public forum (e.g., shopping center, store, hotel, etc.), for example. As used herein, the devices 102(a)-(d) may be any device in a physical environment that may undergo a state transition. The user device 103 may be a device that is held, worn, or otherwise is associated with a user and that displays an AR environment. The devices 102(a)-(d), 103 may be configured to send data to and/or receive data from a system 104, such as via a network 106. In some examples, the network 106 may be a local network associated with the device 102(a)-(d). In other examples, the network 106 may include the system 104 utilizing an internet connection. It should be understood that where operations are described herein as being performed by the system 104, some or all of those operations may be performed by the devices 102(a)-(d), 103. It should also be understood that anytime the system 104 is referenced, that system may include any system and/or device, whether local to a physical environment of the devices 102(a)-(d), 103 or remote from that environment. Additionally, it should be understood that a given space and/or environment may include numerous devices 102(a)-(d), 103. It should also be understood that when a "physical space" or "physical environment" is used herein, those terms mean an area and not necessarily a given room, building, or other structure, unless otherwise specifically described as such.

The user device 103 may include one or more components, such as, for example, one or more processors 108, one or more network interfaces 110, memory 112, one or more microphones 114, one or more speakers 116, one or more displays 118, and/or one or more sensors 119. The microphones 114 may be configured to capture audio, such as user utterances, and generate corresponding audio data. The speakers 116 may be configured to output audio, such as audio corresponding to audio data received from another device. The displays 118 may be configured to display images corresponding to image data, such as image data received from the system 104. The user device 103 may also include sensors 119 configured to detect an environmental condition associated with the devices 102(a)-(d), 103 and/or the physical environment associated with the devices 102(a)-(d), 103. Some example sensors 119 may include one or more microphones configured to capture audio associated with the physical environment in which the device is located, one or more cameras configured to capture images associated with the physical environment in which the device is located, one or more network interfaces configured to identify network access points associated with the physical environment, global positioning system components configured to identify a geographic location of the devices, Bluetooth and/or other short-range communication components configured to determine what devices are wirelessly connected to the device, device-connection sensors configured to determine what devices are physically connected to the device, user biometric sensors, and/or one or more other sensors configured to detect a physical condition of the device and/or the physical environment in which the device is situated. In addition to specific environmental conditions that are detectable by the sensors 119, usage data and/or account data may be utilized to determine if an environmental condition is present. The memory 112 may include components such as an AR application 120. The AR application 120 may be configured to receive user input associated with an AR environment, to initiate and/or maintain an orchestration session, and/or to interact with the devices 102(a)-(d) as described herein.

The devices 102(a)-(d) may include one or more components, such as, for example, one or more processors 122, one or more network interfaces 124, memory 126, one or more microphones 128, one or more speakers 130, and/or one or more displays 132. The microphones 128 may perform similar functions as the microphones 114. The speakers 130 may perform similar functions as the speakers 116. The displays 132 may perform similar functions as the displays 132. The devices 102(a)-(d) may also include one or mor of the sensors described with respect to the user device 103. Additionally, the memory 126 may include components such as device functionality 134 and/or a directive generator 136. The device functionality 134 may include functionality specific to a device 102(a)-(d), such as functionality for turning a light on and off, changing light color and/or brightness, controlling a locking mechanism, adjusting temperature settings, and/or any other functionality associated with a smart device. The directive generator 136 may work in connection with the AR application 120 of the user device 103. For example, when one or more of the devices 102(a)-(d) is to perform a device state transition as described herein, a directive to perform the transition may be generated by the directive generator 136, and that directive may be sent to the appropriate device 102(a)-(d) to perform the device state transition.

It should be understood that while several examples used herein include a voice-enabled device that allows users to interact therewith via user utterances, one or more other devices, which may not include a voice interface, may be utilized instead of or in addition to voice-enabled devices. In these examples, the device may be configured to send and receive data over the network 106 and to communicate with other devices in the system 100. As such, in each instance where a voice-enabled device is utilized, a computing device that does not include a voice interface may also or alternatively be used. It should be understood that when voice-enabled devices are described herein, those voice-enabled devices may include phones, computers, and/or other computing devices.

The system 104 may include components such as, for example, a speech processing system 138, a user registry 140, an orchestrator 142, a device selection component 144, a location component 146, a configuration component 148, a directive generator 150, and/or one or more machine learning models 152. It should be understood that while the components of the system 104 are depicted and/or described as separate from each other in FIG. 1, some or all of the components may be a part of the same system. The speech processing system 138 may include an automatic speech recognition component (ASR) 154 and/or a natural language understanding component (NLU) 156. Each of the components described herein with respect to the system 104 may be associated with their own systems, which collectively may be referred to herein as the system 104, and/or some or all of the components may be associated with a single system. Additionally, the system 104 may include one or more applications, which may be described as skills. "Skills," as described herein may be applications and/or may be a subset of an application. For example, a skill may receive data representing an intent. For example, an intent may be determined by the NLU component 156 and/or as determined from user input via a computing device. Skills may be configured to utilize the intent to output data for input to a text-to-speech component, a link or other resource locator for audio data, and/or a command to a device, such as the devices 102(a)-(d). "Skills" may include applications running on devices, such as the devices 102(a)-(d), and/or may include portions that interface with voice user interfaces of devices 102(a)-(d).

In instances where a voice-enabled device is utilized, skills may extend the functionality of devices 102(a)-(d) that can be controlled by users utilizing a voice-user interface. In some examples, skills may be a type of application that may be useable in association with target devices 102(a)-(d) and may have been developed specifically to work in connection with given target devices 102(a)-(d). Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the voice-enabled device. The application(s) may also be utilized, in examples, to receive input, such as from a user of a user device and/or the voice-enabled device and send data and/or instructions associated with the input to one or more other devices.

Additionally, the operations and/or functionalities associated with and/or described with respect to the components of the system 104 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

With respect to the system 104, the user registry 140 may be configured to determine and/or generate associations between users, user accounts, environment identifiers, and/or devices. For example, one or more associations between user accounts may be identified, determined, and/or generated by the user registry 140. The user registry 140 may additionally store information indicating one or more applications and/or resources accessible to and/or enabled for a given user account. Additionally, the user registry 140 may include information indicating device identifiers, such as naming identifiers, associated with a given user account, as well as device types associated with the device identifiers. The user registry 140 may also include information indicating user account identifiers, naming indicators of devices associated with user accounts, and/or associations between devices, such as the devices 102(a)-(d). The user registry 140 may also include information associated with usage of the devices 102(a)-(d). It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

The speech-processing system 138 may be configured to receive audio data from the devices 102(a)-(d), 103 and/or other devices and perform speech-processing operations. For example, the ASR component 154 may be configured to generate text data corresponding to the audio data, and the NLU component 156 may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "grab that object," the NLU component 156 may identify a "grab" intent associated with an AR session. In this example where the intent data indicates an intent to interact with an AR environment, the speech processing system 138 may call one or more speechlets and/or applications, including the AR application 120 or a system associated therewith, to effectuate the intent. Speechlets, as described herein may otherwise be described as applications and may include functionality for utilizing intent data to generate directives and/or instructions. The AR application 120 may be designated as being configured to handle the intent of determine a target device 102(a)-(d) to operate given the voice interaction with an AR session as described herein, for example. The AR application 120 may receive the intent data and/or other data associated with the user utterance from the NLU component 156, such as by an orchestrator of the system 104, and may perform operations to cause device state transitions of one or more devices 102(a)-(d) based at least in part on an interaction with the AR environment during an AR session, for example. The system 104 may generate audio data confirming that the state transition has occurred, such as by a text-to-speech component. The audio data may be sent from the system 104 to one or more of the devices 102(a)-(d).

The components of the system 100 are described below by way of example. For example, a user may have a user device 103 with the AR application 120 installed thereon or otherwise may have access to the AR application 120 that is not necessarily stored on the user device 103. The user may provide user input to the user device 103 indicating an intent to initiate an orchestration session. The user device 103 may communicate with the system 104, which may be remote from the user device 103 in examples, to initiate the orchestration session and cause the user device 103 to display the AR environment on a display of the user device. Generally, the user would view the AR environment by moving the user device 103 around a given physical environment, and a camera of the user device 103 would capture images of the physical environment and display those images, typically in a live-feed manner, on the display 118 of the device. In addition, one or more virtual objects may be presented on the display 118. The images of the physical environment along with the virtual objects together may form the AR environment that the user may view using the display 118 of the user device 103. In some AR applications, the displayed virtual objects may be based on locations of physical objects in the physical environment, such as when a virtual person is displayed at a location that corresponds to a floor portion of the physical environment. However, integration of various devices 102(a)-(d) within the physical environment with the AR environment such that those devices 102(a)-(d) can be utilized during the AR session may be desired. Additionally, given the vast differences among environments and devices 102(a)-(d) that may be situated in those environments, techniques to dynamically setup devices and applications to be utilized during a given AR session may be desired.

To do so, in examples, the orchestrator 142 may receive an indication that a request to initiate an orchestration session has been received in association with a given user device 103. Based at least in part on receiving the request, the orchestrator 142 may query one or more datastores and/or the user registry 140 to determine whether an orchestration session has been utilized in association with the user device 103 in the past. In examples where such an orchestration session has not occurred, the orchestrator 142 may initiate a process of determining which devices 102(a)-(d) are physically present in the physical environment, which devices 102(a)-(d) may be utilized in association with a given AR application 120, locations of such devices 102(a)-(d) in association with the user device 103 and/or with each other, and what data is to be sent to the AR application 120 to enable the AR application 120 to utilize the selected devices 102(a)-(d) during a given AR session. Additional details on determining whether a given AR session has already been associated with certain devices 102(a)-(d) are provided with respect to FIG. 6, below.

To start, the orchestrator 142 may query the device selection component 144. The device selection component 144 may be configured to determine what devices 102(a)-(d) are physically present in the physical environment 172 and can be utilized during AR sessions. In examples, the device selection component 144 may receive an identifier of the user device 103, an identifier of a companion application associated with the system that is installed on the user device 103, identifiers of other devices 102(a)-(d) such as voice interface devices that are in short-range communication with the user device 103 (which may include devices in the physical environment 172), an identifier of a wireless network identifier currently associated with the user device 103, and/or other identification data that the device selection component 144 may utilize to determine what environment the user device 103 is currently situated in. The device selection component 144 may then utilize this identifying information to determine devices 102(a)-(d) that are associated with user account data for the physical environment 172. Take, for example, a home that has multiple smart lights, multiple smart speakers, televisions, appliances, and other devices. Each of these devices 102(a)-(d) may have been previously associated with user account data, such as by wireless discovery of such devices 102(a)-(d), control of such devices 102(a)-(d) using voice input and/or input to a graphical user interface of a user device 103, etc. The device selection component 144 may identify these devices 102(a)-(d) and determine that such devices 102(a)-(d) are to be associated with the physical environment 172 for use during an AR session.

In other examples, additional operations may be performed to determine which of the devices 102(a)-(d) associated with user account data are to be considered candidate devices for an orchestration session. For example, environmental data may be received from the user device 103 and/or other devices 102(a)-(d) in the physical environment that may indicate which room or otherwise portion of a physical environment the user device 103 is situated in when the request to initiate the orchestration session is received. By way of example, the user device 103 may be situated in a living room of the physical environment and the living room may include only a portion of the devices 103 associated with the user account data. The environmental data may be any data that may be utilized to detect where the user device 103 is situated, but by way of example may include global positioning data, RSSI data, image data that is analyzed such as via computer vision processing, etc. The user account data itself may also be utilized to identify devices 102(a)-(d) associated with a given room or otherwise portion of the physical environment. For example, if the device selection component 144 determines that the user device 103 is located in a living room of the physical environment, device naming indicators, device group names, device affinity data, and/or other data showing prior interactions of the various devices 102(a)-(d) may be utilized to determine what other devices 102(a)-(d) are likely situated in the living room.

Additionally, the device selection component 144 may be configured to receive user input data indicating manual selection of devices 102(a)-(d). The selection of devices 102(a)-(d) may be performed on one of the devices 102(a)-(d) and/or the device 103. For example, a user interface associated with the AR application 120 may display options or otherwise allow for user input to select one or more of the devices 102(a)-(d) for inclusion in the orchestration session. In these examples, the user interface may show options for some or all of the devices associated with the user account data, for some or all of the devices located in the physical environment 172, for some or all of the devices associated with capabilities of the AR application 120, etc. In should be understood that while physical user input to a device is described for receiving manual user input data, the user input may be in any form and may specifically include speech input.

The device selection component 144 may then utilize these candidate devices to determine a subset of the candidate devices that may be utilized by the AR application 120 at issue during an AR session. For example, one or more AR applications may be utilized by the user device 103. Example AR applications may include AR applications associated with games, learning systems, experiential systems, etc. Across AR applications, differing levels of AR functionality may be developed and that AR functionality may limit the types and/or number of devices that can be used during an AR session. For example, a given AR application may be configured to utilize light-emitting devices such as smart lights, but may not be configured to utilize image-output devices and/or audio-output devices. In other examples, the AR application may be configured to utilize some or all types of such devices. Characteristics data from the AR application 120 may be received that indicates the configuration of the AR application 120, and this characteristics data may be utilized by the device selection component 144 to determine a subset of the candidate devices that may be utilized during an AR session with the AR application 120. In examples, the characteristics data may include a size and/or boundary of the AR environment to be generated. This data may be utilized to determine which devices are selected as candidate devices for inclusion in an orchestration session for the AR environment. It should be understood that while the devices 102(a)-(d) have been described herein as being capable of performing certain actions such as outputting images, outputting audio, emitting light, etc., the devices 102(a)-(d) may perform any action and produce any output, such as, for example, a haptic output that may cause a user to feel a response from a device 102(a)-(d) such as a vibration or ringing.

In the example of FIG. 1, the device selection component 144 may have determined from user account data that the user account data is associated with a set of user devices 170 including devices 102(a)-(d) as well other devices 176. The device selection component 144 may also have determined, utilizing the techniques described above, that only devices 102(a)-(d) are devices in the particular physical environment 172 where the AR application 120 has been initiated. Additionally, the device selection component 144 may have determined, utilizing the techniques described above, that only devices 102(a) and 102(b) are AR application compatible devices 174, excluding devices 102(c) and 102(d) from the orchestration session at issue. Having made these determinations, the configuration component 148 may be utilized on the fly to communicate with the AR application 120 to enable the AR application 120 to control devices 102(a) and 102(b) during an AR session.

In addition to determining the devices 102(a)-(d) that may be utilized, the location component 146 may be configured to determine locations of one or more of the subset of devices 102(a)-(d) relative to each other and/or to the user device 103 at issue. For example, a number of techniques may be utilized to determine device locations relative to other devices in the physical environment. For example, RSSI data may be queried from one or more of the devices 102(a)-(d) indicating signal strength as between any two devices 102(a)-(d). Increased signal strength may indicate devices 102(a)-(d) are closer to each other than decreased signal strength. Additionally, when a voice interface device 102(a)-(d) is situated in the physical environment, beamforming or other microphone-based techniques may be utilized to detect an orientation of a given device from the voice interface device. Additionally, when one or more of the devices 102(a)-(d) includes a camera, image data from the camera and computer vision techniques may be utilized to detect device location and orientation. It should be understood that the use of image data from device cameras is only be performed when user consent to do so is provided. Additionally, when one or more of the devices 102(a)-(d) includes radar-based technology, such as ultrasonic technology, this technology may be employed to detect location and orientation of devices 102(a)-(d) in the physical environment.

When computer vision techniques are utilized as described herein, computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Some functions and components (e.g., hardware) found in many computer vision systems are described here. For example, a digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, and/or an image sequence. The pixel values may correspond to light intensity in one or several spectral bands (gray images or color images), but can also be related to various physical measures, such as depth, absorption or reflectance of sonic or electromagnetic waves, or nuclear magnetic resonance. Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales. Image features at various levels of complexity are extracted from the image data. Typical examples of such features are: lines, edges, and ridges; localized interest points such as corners, blobs, or points; and/or features related to texture, shape, or motion. At some point in the processing a decision may be made about which image points or regions of the image are relevant for further processing. Examples include: selection of a specific set of interest points; segmentation of one or multiple image regions that contain a specific object of interest; and/or segmentation of the image into nested scene architecture comprising a foreground, object groups, single objects, or salient object parts (also referred to as spatial-taxon scene hierarchy). At this point, the input may be a small set of data, for example a set of points or an image region that is assumed to contain a specific object. The remaining processing may comprise, for example: verification that the data satisfy model-based and application-specific assumptions; estimation of application-specific parameters, such as object pose or object size; classification of a detected object into different categories; and/or comparing and combining two different views of the same object. Making the final decision required for the application, for example match/no-match in recognition applications, may then be performed.

Once the subset of devices 102(a)-(d) is determined and the location data described herein is generated, the configuration component 148 may generate configuration data. The configuration data may indicate the subset of devices 102(a)-(d), device types of those devices 102(a)-(d), device capabilities, one or more applications utilized to control such devices 102(a)-(d), and/or communication data that may be utilized by the AR application 120 to interface with the system 104 to cause device state transitions when desired by the AR application 120. This communication data may include one or more API and/or other information that may be utilized by the AR application 120 to request the device state transitions to occur. Additionally, the configuration data may include the location data, which may be formatted such that the AR application 120 can determine when interactions in the AR environment correspond to the locations of the devices 102(a)-(d) at issue. Some or all of this configuration data may be utilized by the AR application 120 to determine when and how to utilize the devices 102(a)-(d) in the physical environment during an AR session. By so doing, the devices 102(a)-(d) in the physical environment may be setup for use by the AR application 120.

In use, the AR application 120 may cause an AR environment to be displayed on the user device 103. Additionally, one or more interactions with the AR environment may occur during a given AR session. The interactions may be based at least in part on user input, such as a user touching the display 118 of the user device 103, the user moving a field of view of the camera of the user device 103, sensors of the user device 103 indicating orientation, motion, or speed of the user device 103, a storyline and/or progression of the AR session, etc. Utilizing the configuration data, the AR application 120 and/or the orchestrator 142 of the system 104 may determine that certain interactions with the AR environment are associated with control of one or more of the devices 102(a)-(d) in the physical environment. For example, a given interaction may cause a light-emitting device to transition states, such as from an on state to an off state, vice versa, performance of a color change, performance of a brightness change, etc. In another example, a given interaction may cause an audio-output device to transition states, such as from an off state to a state where the device outputs certain audio, increasing or decreasing of volume, etc. In another example, a given interaction may cause an image-output device to transition states, such as a state transition that causes certain images to be displayed, causes images to cease being displayed, etc. In some examples, the devices 102(a)-(d) at issue may be multimodal or otherwise may include multiple types of the functionality described herein, and some or all of these functionalities may be utilized in response to a given interaction with the AR environment. Other example device state changes may be causing a door lock to lock or unlock, a garage door to open or close, a thermostat to change a temperature in the physical environment, an appliance such as an oven to turn on or off, etc. When a device 102(a)-(d) is to perform a state transition as described herein in association with an AR session, the directive generator 150 of the system 104 and/or the directive generator 136 of one or more of the devices 102(a)-(d) may generate a directive to perform the state transition and send data representing the directive to the appropriate device 102(a)-(d) to cause the state transition to occur.

In addition to the above, specific continuing interactions between the user device 103 and a device 102(a)-(d) in the physical environment, such as an image-output device may be possible given the techniques described herein. As an example, the AR environment as displayed on the user device 103 may include a virtual object, such as a rope. The image-output device may present an image of an object, such as a key, to be acquired by the virtual rope displayed in the AR environment. The user may provide user input to the user device 103 to "flick" the rope toward the physical location of the image-output device. The user device 103 and the image-output device may send and receive data with each other to cause display of the rope to occur on the image-output device. Depending on the user input, the rope may "lasso" or otherwise interact with the object displayed on the image-output device. The user may then provide user input to the user device 103 to "pull" the rope back to the user device 103, and as the user input is provided, the image-output device may display images depicting the rope being pulled back to the user device 103 with the object, here the key. Other forms of image transfer and interaction between the user device 103 and other devices 102(a)-(d) in the physical environment are also disclosed herein.

In still other examples, the AR environment may be viewed via the user device 103, and when the field of view of the camera of the user device 103 depicts an image-output device, a virtual object may be displayed in the AR environment as if the object were being displayed by the user device 103. These virtual objects may be interacted with by the user, such as the virtual objects being "grabbed" from the image-output device and placed into the AR environment in a location other than where the image-output device is situated and/or placed onto another image-output device. By so doing, a device that has not been configured for use with the AR environment (and/or is not turned on), may still be utilized as a device in the AR environment. This same process may be performed with respect to light representations from light-emitting devices, audio representations from audio-emitting devices, etc.

Additionally, when a voice interface device is situated in the physical environment associated with an AR session, the voice interface device may be selected to output audio associated with the AR session, such as instead of the user device 103 outputting the audio. Additional functionality of the AR environment may be defaulted to certain of the devices 102(a)-(d) instead of that functionality being performed by the user device 103 that is displaying the AR environment.

Additionally, in certain examples, a given AR session may include more than one user and more than one user device 103. The system 104 described herein may be configured to synchronize the AR session at issue with the multiple user devices 103 such that each user device 103 displays the AR environment from that user device's perspective. In this example, while a certain user device 103 may not generally have access to control of devices 102(a)-(d) in the physical environment, such as when a guest is present in the physical environment and would not typically be permitted to control the smart lights in that environment with the user device 103, execution of the AR session may allow those user devices 103 to interact with the AR environment, and those interactions may cause the device state transitions of the physical devices 102(a)-(d) as described herein. In these examples, cross-device audio/video coordination may be performed to ensure a desirable experience for multiple users. For example, in a single-user example, a given audio and/or video source may be utilized. However, in a multi-user example, outputting multiple instances of the same audio and/or video (one for each user device) may lead to an undesirable user experience. As such, the system 104 may determine which device(s) are to output certain content at certain times during an AR session such that a single instance of the content is output to the shared multi-user environment. Additionally, in a multi-user experience, multiple voice interface devices may be involved and may each receive speech input during an AR session. Device and/or speech input arbitration functionality may be employed by the voice interface devices to determine when speech input is to be utilized from a given device, which user profile to associate with given speech input, and/or when to enable and disable speech input acceptance on given devices during the AR session.

In these and other examples where an AR session has been established, the orchestrator 142 may perform a number of operations to ensure that an execution component 143 is communicating data needed to cause the device state transitions described herein. For example, a user may provide user input to an image-output device situated in a physical environment. In this example, the user input may be to enable an application running on the image-output device and/or to enable an application available to the image-output device. The main client of the image-output device may be enabled in response to the user input and this main client may be configured to run a main AR session on the image-output device during an AR session. An image maker of the main client may receive image data configured to be displayed on the image-output device during an AR session and may perform operations necessary for display of corresponding images when appropriate.

In response to the user input requesting to initiate an AR session, the main client may send data to the system 104 indicating that the user input has been received. The indication may provide information on the AR application to be utilized, the image-output device that received the user input, and/or other information acquired by the main client. This data may be received at the execution component 143, which may include an AR service and AR data. The AR service may receive the data from the image-output device and may generate a session-initiation identifier for the AR session at issue. This session-initiation identifier may be associated with an identifier of the image-output device, and this data may be stored in association with the AR data.

In addition to initiating the AR session with the image-output device, additional user input may be received at the user device 103 that is situated in the same physical environment as the image-output device. This additional user input may be an indicator that the user device 103 is to be associated with the AR session. In an example, a link, quick reference (QR) code, or other element may be displayed on the image-output device. The image maker may be configured to generate and/or display an image of the element to be utilized by the user device 103. In this example, an AR client may be running on the user device 103 and may include an AR subsystem and an image maker reader. The AR subsystem may be configured to display functionality for initiating the AR session on the user device 103 as well as for capturing an image or other data from the image-output device to synchronize or otherwise associate those devices with each other for the AR session. The image maker reader may receive image data, QR code data, or other data from the image rendered on the image-output device.

The user device 103 may send the image data, QR code data, or other data as read by the image maker reader to the AR server environment. The AR service may receive this data and may correlate that data with the data received from the image-output device and/or the identifier information stored in the AR data. In this example, the AR service may determine that the data from the user device 103 corresponds to the data from the image-output device and/or that one or more conditions have been satisfied for associating those devices for purposes of the AR session.

The execution component 143 may communicate with a spatial session sync component 153. The spatial session sync component 153 may include a spatial session sync, AR session data, user and object tracking data, and/or two-dimensional (2D) screen localization data. The spatial session sync component 153 may be responsible for associating devices in the physical environment with functionality associated with the AR session. To do so, the AR session data may be stored and may indicate virtual objects associated with the AR session, storylines, gameplay, and/or other interactions with the AR session at issue, and/or any other data indicating potential functionality of the devices and the AR environment during the AR session. The user and object tracking data may indicate location information for the user device that is displaying the AR environment, location information for the one or more devices in the physical environment, and/or location information of the user and/or one or more virtual users in the physical environment. The 2D screen localization data may generate and/or store data indicating where the image-output device is located in association with the user device and/or one or more other devices in the physical environment. Some or all of the information from the AR session data, the user and object tracking data, and/or the 2D screen localization data may be utilized by the spatial session sync component to generate the AR environment described herein and/or to place device representations of the devices in the AR environment.

Spatial sync data from the spatial session sync component 153 may be sent to the execution component 143. The AR service may receive the spatial sync data and may determine which devices to send the spatial sync data to. Those devices may include the image-output device that initiated the request for the AR session as well as the user device 103 that is associated with the AR session. Additionally, if one or more other image-output device and/or user devices 103 (including those operated by other users) are associated with the AR session, the spatial sync data may be sent to those devices as well.

The execution component 143 may send the spatial sync data to the AR client on the user device 103 along with AR session data configured to cause the AR client to display the AR environment on the user device 103. Additionally, in some examples more than one image-output device is situated in the physical environment in question. In these examples, the secondary image-output device may include an auxiliary client that runs an image maker. The image maker of the auxiliary client may receive image data and/or other data associated with the AR session from the execution component 143 to cause display of images associated with the AR session. By so doing, synchronization of images associated with the AR session may be achieved across the various image-output devices and the user device 103 during the AR session.

As used herein, the components responsible for selecting devices for AR sessions, determining device location data, generating configuration data, etc. may be machine learning models 152. For example, the machine learning models 152 as described herein may include predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases and may be utilized to predict trends and behavior patterns. In examples, the event, otherwise described herein as an outcome, may be an event that will occur in the future, such as whether presence will be detected. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Then, data may be collected and/or accessed to be used for analysis.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter, predictive modelling may be performed to generate accurate predictive models for future events. Outcome prediction may be deterministic such that the outcome is determined to occur or not occur. Additionally, or alternatively, the outcome prediction may be probabilistic such that the outcome is determined to occur to a certain probability and/or confidence.

As described herein, the machine learning models 152 may be configured to be trained utilizing a training dataset associated with the prior AR sessions and directives sent to devices 102(*a*)-(*d*). The models may be trained for multiple user accounts and/or for a specific user account. As such, the machine learning models 152 may be configured to learn, without human intervention, attributes of collected data and/or actions taken associated with AR sessions that are more likely and/or less likely to be associated with selection of a given device 102(*a*)-(*d*) as a target device to perform a state transition during an AR session.

It should be noted that while text data is described as a type of data utilized to communicate between various components of the system 104 and/or other systems and/or devices, the components of the system 104 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the devices 102(*a*)-(*d*).

As shown in FIG. 1, several of the components of the system 104 and the associated functionality of those components as described herein may be performed by one or more of the devices 102(*a*)-(*d*), 103. Additionally, or alternatively, some or all of the components and/or functionalities associated with the devices 102(*a*)-(*d*), 103 may be performed by the system 104.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 108, 122, and/or the processor(s) described with respect to the components of the system 104, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 108, 122, and/or the processor(s) described with respect to the components of the system 104 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108, 122, and/or the processor(s) described with respect to the components of the system 104 may possess its own local memory, which also may store program components, program data, and/or one or more operating systems.

The memory 112, 126, and/or the memory described with respect to the components of the system 104 may include volatile and nonvolatile memory, removable and non-removable media implemented in any method or technology for storage of information, such as computer-readable instructions, data structures, program component, or other data. Such memory 112, 126, and/or the memory described with respect to the components of the system 104 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 112, 126, and/or the memory described with respect to the components of the system 104 may be implemented as computer-readable storage media ("CRSM"), which may be any available physical media accessible by the processor(s) 108, 122, and/or the processor(s) described with respect to the system 104 to execute instructions stored on the memory 112, 126, and/or the memory described with respect to the components of the system 104. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 112, 126, and/or the memory described with respect to the components of the system 104, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 110, 124, and/or the network interface(s) described with respect to the components of the system 104 may enable messages between the components and/or devices shown in system 100 and/or with one or more other polling systems, as well as other networked devices. Such network interface(s) 110, 124, and/or the network interface(s) described with respect to the components of the system 104 may include one or more network interface controllers (NICs) or other types of transceiver devices to send and receive messages over the network 106.

For instance, each of the network interface(s) 110, 124, and/or the network interface(s) described with respect to the components of the system 104 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 110 and/or the network interface(s) described with respect to the components of the system 104 may include a wide area network (WAN) component to enable message over a wide area network.

In some instances, the system 104 may be local to a physical environment associated the devices 102(*a*)-(*d*), 103. For instance, the system 104 may be located within one or more of the devices 102(*a*)-(*d*), 103. In some instances, some or all of the functionality of the system 104 may be performed by one or more of the devices 102(*a*)-(*d*), 103. Also, while various components of the system 104 have been labeled and named in this disclosure and each component has been described as being configured to cause the processor(s) to perform certain operations, it should be understood that the described operations may be performed by some or all of the components and/or other components not specifically illustrated. It should be understood that, in addition to the above, some or all of the operations described herein may be performed on a phone or other mobile device and/or on a device local to the physical environment, such as, for example, a hub device and/or edge server in a home and/or office environment, a self-driving automobile, a bus, an airplane, a camper, a trailer, and/or other similar object having a computer to perform its own sensor processing, etc.

Figure 2:
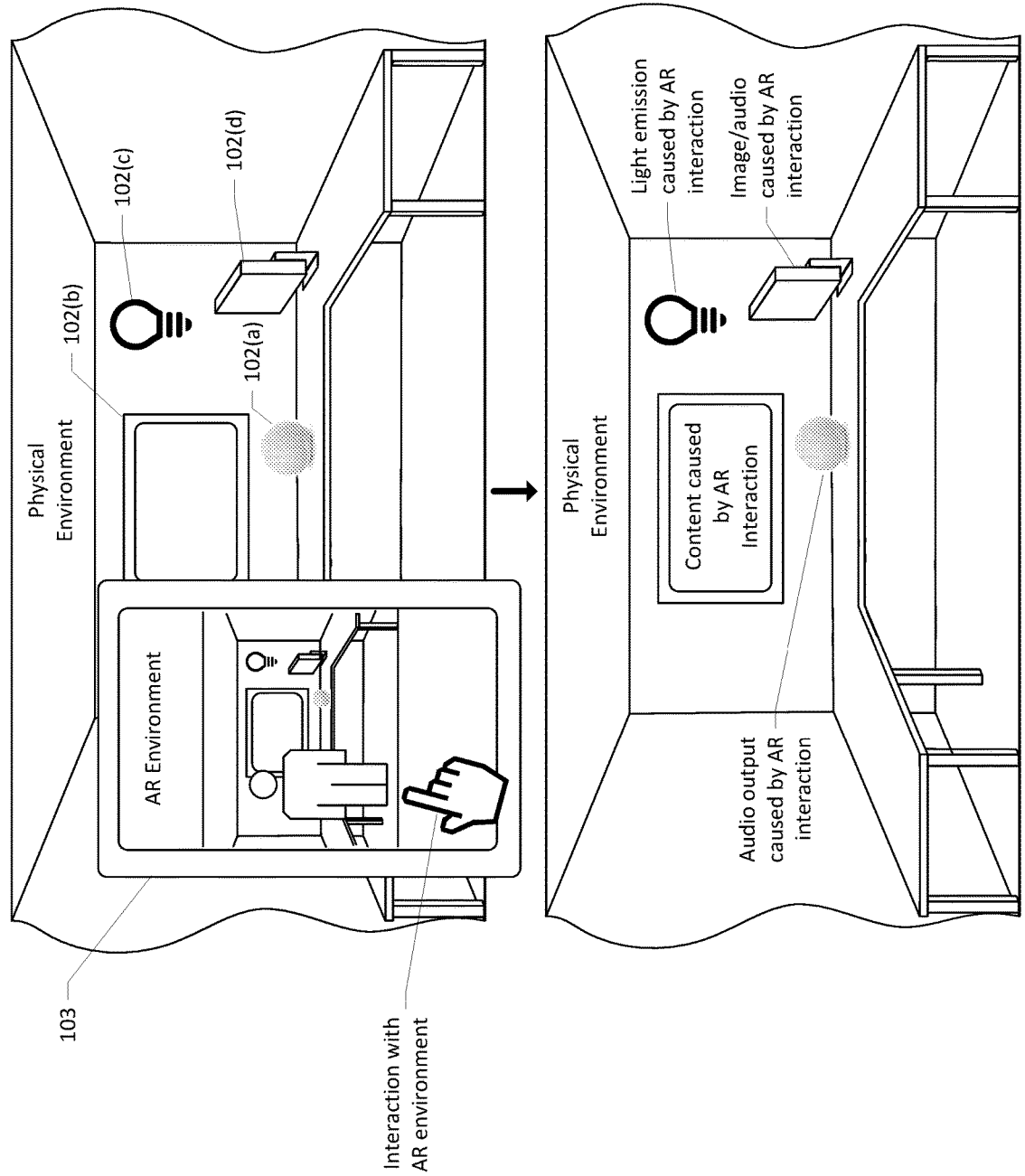
FIG. 2 illustrates a schematic diagram of an example where interaction with an AR environment causes state changes to devices in a physical environment.

FIG. 2 illustrates a schematic diagram of an example where interaction with an AR environment causes state changes to devices in a physical environment. FIG. 2 may include some of the same components and devices as described with respect to FIG. 1. For example, FIG. 2 may include one or more devices 102(*a*)-(*d*) situated in a physical environment and a user device 103. The devices 102(*a*)-(*d*) may be the same or similar to the devices 102(*a*)-(*d*) described with respect to FIG. 1, and the user device 103 may be the same or similar to the user device 103 described with respect to FIG. 1.

FIG. 2 shows a scenario where an AR session has been initiated in a physical environment and an AR environment is being displayed on the user device 103. The AR environment may include representations of physical objects from the physical environment, including the device 102(*a*)-(*d*), as well as one or more virtual objects. In use, an AR application that is accessible by the user device 103 may cause the AR environment to be displayed on the user device 103. Additionally, one or more interactions with the AR environment may occur during a given AR session. The interactions may be based at least in part on user input, such as a user touching the display of the user device 103, the user moving a field of view of the camera of the user device 103, a storyline and/or progression of the AR session, etc. As shown in FIG. 2, the interaction may include a user touching a screen of the user device 103 in a certain manner. However, it should be understood that use of the devices 102(*a*)-(*d*) in association with an AR session need not be based on a user interaction with the user device 103. Instead, use of the devices 102(*a*)-(*d*) may be based at least in part on any given event predetermined to be associated with one or more of the devices 102(*a*)-(*d*). For example, a storyline of the AR session may include a portion with lightning and thunder. When this portion of the storyline occurs, audio-output devices from the physical environment may output audio corresponding to thunder, the light-emitting devices may flicker to represent lightning, and/or image-output devices may display images of lightning occurring. In still other examples, a user may move a field of view of a camera of the user device 103 from a virtual room that is black to a virtual room with two virtual torches. In this example, two light-emitting devices that are at or near locations of the virtual torches may be caused to emit light to represent the torches, such as a flickering yellow, red, and orange light.

To do so, utilizing the configuration data, the AR application and/or an orchestrator of the system described herein may determine that certain interactions with the AR environment are associated with control of one or more of the devices 102(*a*)-(*d*) in the physical environment. For example, a given interaction may cause a light-emitting device to transition states, such as from an on state to an off state, vice versa, performance of a color change, performance of a brightness change, etc. In another example, a given interaction may cause an audio-output device to transition states, such as from an off state to a state where the device outputs certain audio, increasing or decreasing of volume, etc. In another example, a given interaction may cause an image-output device to transition states, such as a state transition that causes certain images to be displayed, causes images to cease being displayed, etc. In some examples, the devices 102(a)-(d) at issue may be multimodal or otherwise may include multiple types of the functionality described herein, and some or all of these functionalities may be utilized in response to a given interaction with the AR environment. Other example device state changes may be causing a door lock to lock or unlock, a garage door to open or close, a thermostat to change a temperature in the physical environment, an appliance such as an oven to turn on or off, etc.

Prior to the interactions with the AR environment described above, the AR application and/or the orchestrator may utilize the configuration data to map locations of the devices 102(a)-(d) to certain portions of the AR environment. This mapping may include identifying a location of a given device 102(a)-(d) in the physical environment and generating a representation of that device 102(a)-(d) at a corresponding location in the AR environment. The device representation may be associated with functionality of the device 102(a)-(d) as determined from the configuration data, and the AR application may generate an association between the device functionality and the device representation in the AR environment. By so doing, the AR application may store data indicating that when an event occurs in association with the location where the device representation is situated in the AR environment, that event may be utilized to perform a device state transition on the device 102(a)-(d) in question. Also prior to the interactions with the AR environment described herein, image data from the user device 103 may be utilized to confirm and/or determine that a certain interaction is associated with a portion of the AR environment where the device representation is situated. To do so, computer vision techniques as described more fully with respect to FIG. 1 may be utilized. When computer vision techniques are utilized to analyze image data as described herein, the image data may be received from the user device 103, which may capture one or more images of the physical environment in question using a camera and/or sensors during an orchestration session to associate devices 102(a)-(d) with an AR environment. The user device 103 may utilize its cameras and/or sensors to capture images for processing at any point during a particular orchestration session and/or AR session.

In examples, the mapping between a location of a device in the physical environment and the location of the device as represented in the AR environment may be utilized to determine when devices move toward and/or away from each other in the AR environment, when devices interact with each other in the AR environment, and/or when any other location-based event occurs with respect to the AR environment. By so doing, the AR application may utilize the configuration data as described herein to determine when an event associated with a location of one or more of the device 102(a)-(d) in the AR environment occurs and may cause an action to be performed by one or more of the devices 102(a)-(d) in the physical environment. Additionally, in examples, a representation of the action may be displayed in the AR environment at the location of the devices 102(a)-(d) as represented in the AR environment. This representation may include a lighting representation, outputting of audio associated with the action, display of images in the AR environment, etc. Additional details on example interactions between devices in association with the AR environment are provided below with respect to FIGS. 3 and 4.

Figure 3:
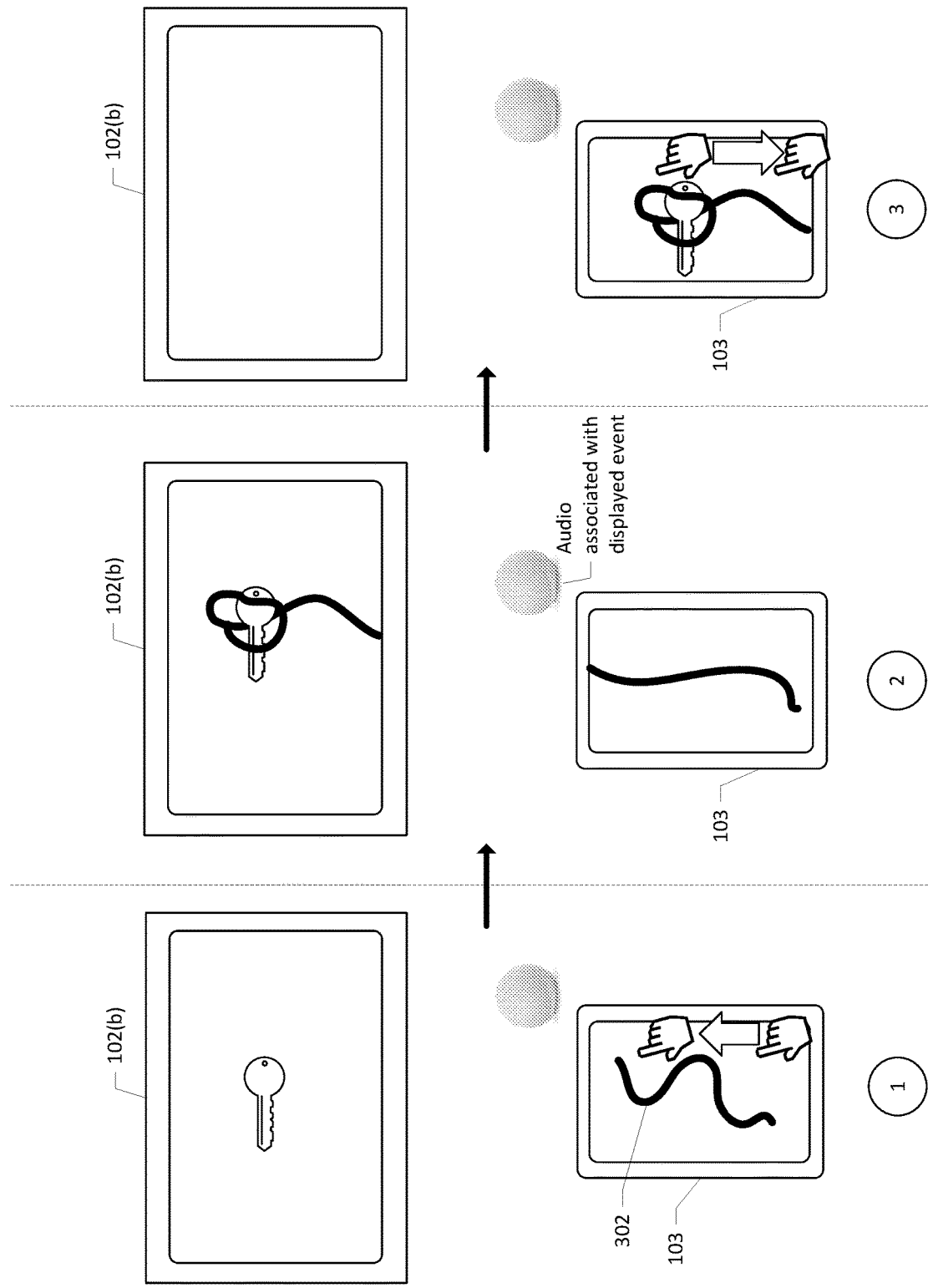
FIG. 3 illustrates example user interfaces showing interaction between a user device and an image-output device during an AR session.

FIG. 3 illustrates example user interfaces showing interaction between a user device 103 and an image-output device 102(a)-(d) during an AR session. FIG. 3 may include some of the same components and devices as described with respect to FIG. 1. For example, FIG. 2 may include one or more devices 102(a)-(d) situated in a physical environment and a user device 103. The devices 102(a)-(d) may be the same or similar to the devices 102(a)-(d) described with respect to FIG. 1, and the user device 103 may be the same or similar to the user device 103 described with respect to FIG. 1. FIG. 3 is described with respect to steps 1-3. However, it should be understood that the processes described with respect to FIG. 3 may be performed in any number of steps and the steps need not be performed in the exact order described with respect to FIG. 3.

As shown in FIG. 3, at step 1, an AR session is occurring and an AR environment associated with the AR session is being displayed on the user device 103. As part of the AR environment, a virtual object 302 is being displayed, here by example the virtual object is a "rope." Additionally, in the physical environment where the user device 103 is situated, the image-output device 102(b) is being caused to display an image that includes an object representation 304. The object representation 304 in this example is a "key," and the object representation 304 is viewable both in the physical environment by a user looking at the image-output device 102(b) as well as in the AR environment by the user looking at a display of the user device 103 while a field of view of a camera of the user device 103 depicts the image-output device 102(b).

In this example, specific continuing interactions between the user device 103 and the device 102(b) may be possible given the techniques described herein. As an example, the user may provide user input to the user device 103 to "flick" the rope toward the physical location of the image-output device 102(b). The user device 103 and the image-output device 102(b) may send and receive data with each other to cause display of the rope to occur on the image-output device 102(b), at step 2. Depending on the user input, the rope may "lasso" or otherwise interact with the object representation 304 displayed on the image-output device. The user may then, at step 3, provide user input to the user device 103 to "pull" the rope back to the user device 103, and as the user input is provided, the image-output device 102(b) may display images depicting the rope being pulled back to the user device 103 with the object representation 304, here the key. Other forms of image transfer and interaction between the user device 103 and other devices 102(a)-(d) in the physical environment are also disclosed herein.

In addition to the image-based interactions and displays described with respect to FIG. 3, one or more of the other devices 102(a)-(d) in the physical environment may be utilized when the image-based interactions are occurring. For example, audio representing the sound of a rope being thrown, and/or a rope hitting a floor, and/or a "clanking" of a key on the floor may be associated with the image-based interactions. Audio data corresponding to this audio may be caused to be output by one or more of the devices 102(a)-(d) with audio-output functionality while the image-based interactions are occurring. Additional multi-modal functionality is also included in this disclosure. For example, a virtual lever may be displayed in the AR environment and when a user interacts with the virtual lever it may cause a smart lock in the physical environment to unlock, and/or an oven to turn, and/or a temperature setting in a room to be adjusted, and/or any other functionality that any other smart device may perform.

In a different example, an image-output device 102(b) may be identified as being depicted in a field of view of a camera of the user device 103, and when detected, the AR environment may be caused to include a representation of a person and/or avatar on the image-output device 102(b) (whether as projected by the image-output device 102(b) or as displayed in the AR environment). When the avatar talks or otherwise audio is associated with the avatar, a smart speaker in the physical environment may be caused to output the audio while the image-output device 102(b) displays images corresponding to the avatar.

In these and other examples, when an event occurs in association with a location of a given device in the AR environment, the AR application may communicate with a smart home system and/or other system associated with the device in question. The AR application may request that a device state transition be performed by the device based at least in part on the event occurring at the location in the AR environment. The smart home system and/or other system may receive the request and may send a directive to the device in question to cause the device to perform the device state transition. Examples of device state transitions are provided herein with respect to FIG. 2.

Figure 4:
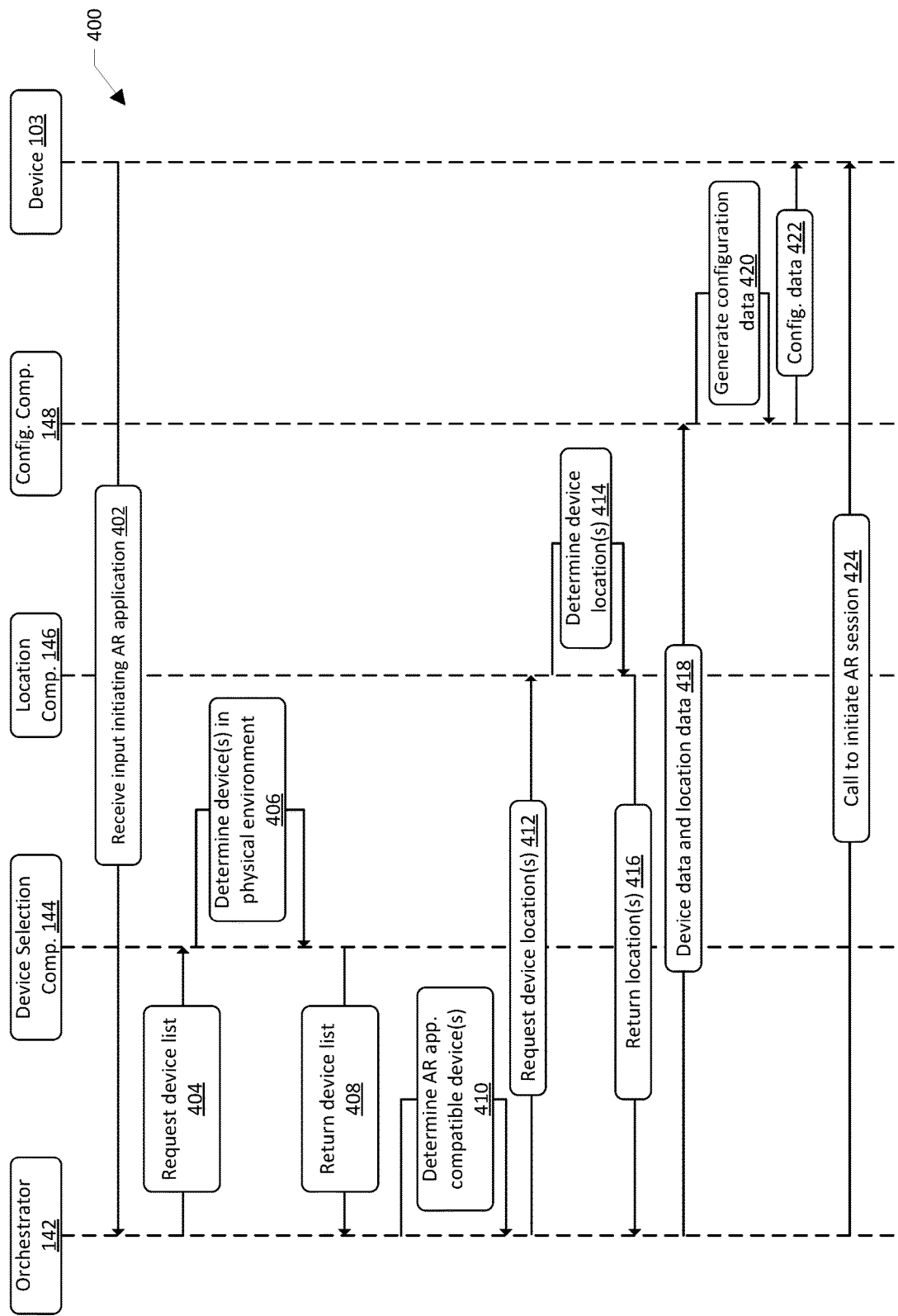
FIG. 4 illustrates a sequence diagram of an example process for setup and coordination of multiple devices in a physical environment for use during an AR session.

FIG. 4 illustrates processes for device integration with AR environments. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the physical environments, architectures and systems described in the examples herein, such as, for example those described with respect to FIGS. 1-3 and 5-11, although the processes may be implemented in a wide variety of other environments, architectures and systems.

FIG. 4 illustrates a sequence diagram of an example process 400 for setup and coordination of multiple devices in a physical environment for use during an AR session. The order in which the operations or steps are described is not intended to be construed as a limitation, and any number of the described operations may be combined in any order and/or in parallel to implement process 400.

At block 402, a user device 103 may send an indication that the user device 103 has received input initiating an AR application to an orchestrator 142 of a system, such as the system 104 described with respect to FIG. 1. For example, a user may have a user device 103 with the AR application installed thereon or otherwise may have access to an AR application that is not necessarily stored on the user device 103. The user may provide user input to the user device 103 indicating an intent to initiate an orchestration session. The user device 103 may communicate with one or more other devices, which may be remote from the user device 103, to initiate the orchestration session and cause the user device 103 to display the AR environment on a display of the user device 103. As noted above, initiation of the AR application and/or an orchestration session may be performed by devices other than the user device 103, and the user device 13 may join the applicable session utilizing a code, link, or otherwise. Generally, the user would view the AR environment by moving the user device 103 around a given physical environment, and a camera of the user device 103 would capture images of the physical environment and display those images, typically in a live-feed manner, on the display of the user device 103. In addition, one or more virtual objects may be presented on the display. The images of the physical environment along with the virtual objects together may form the AR environment that the user may view using the display of the user device 103. In some AR applications, the displayed virtual objects may be based on locations of physical objects in the physical environment, such as when a virtual person is displayed at a location that corresponds to a floor portion of the physical environment.

At block 404, the orchestrator 142 may request a device list from a device selection component 144. For example, the orchestrator 142 may receive the request to initiate the AR application, and based at least in part on receiving the request, the orchestrator 142 may query one or more datastores to determine whether an orchestration session has been utilized in association with the user device 103 in the past. In examples where such an orchestration session has not occurred, the orchestrator 142 may initiate a process of determining which devices are physically present in the physical environment, which devices may be utilized in association with a given AR application, locations of such devices in association with the user device and/or with each other, and what data is to be sent to the AR application to enable the AR application to utilize the selected devices during a given AR session.

At block 406, the device selection component 144 may determine one or more devices in a physical environment associated with the user device 103. For example, the device selection component 144 may be configured to determine what devices are physically present in the physical environment and can be utilized during AR sessions. In examples, the device selection component 144 may receive an identifier of the user device 103, an identifier of a companion application associated with the system that is installed on the user device 103, identifiers of other devices such as voice interface devices that are in short-range communication with the user device 103, an identifier of a wireless network identifier currently associated with the user device 103, and/or other identification data that the device selection component 144 may utilize to determine what environment the user device 103 is currently situated in. The device selection component 144 may then utilize this identifying information to determine devices that are associated with user account data for the physical environment. Take, for example, a home that has multiple smart lights, multiple smart speakers, televisions, appliances, and other devices. Each of these devices may have been previously associated with user account data, such as by wireless discovery of such devices, control of such devices using voice input and/or input to a graphical user interface of a user device 103, etc. The device selection component 144 may identify these devices and determine that such devices are to be associated with the physical environment for use during an AR session.

In other examples, additional operations may be performed to determine which of the devices associated with user account data are to be considered candidate devices for an orchestration session. For example, environmental data may be received from the user device 103 and/or other devices in the physical environment that may indicate which room or otherwise portion of a physical environment the user device 103 is situated in when the request to initiate the AR application is received. By way of example, the user device 103 may be situated in a living room of a physical environment and the living room may include only a portion of the devices associated with the user account data. The environmental data may be any data that may be utilized to detect where the user device 103 is situated, but by way of example may include global positioning data, RSSI data, image data that is analyzed such as via computer vision processing, etc. The user account data itself may also be utilized to identify devices associated with a given room or otherwise portion of the physical environment. For example, if the device selection component 144 determines that the user device 103 is located in a living room of the physical environment, device naming indicators, device group names, device affinity data, and/or other data showing prior interactions of the various devices may be utilized to determine what other devices are likely situated in the living room.

At block 408, the device selection component 144 may return the requested device list to the orchestrator 142. For example, the device selection component 144 may generate device data indicating the selected devices and/or information associated with the selected devices. This device data may be sent from the device selection component 144 to the orchestrator 142 in response to the request for the device list.

At block 410, the orchestrator 142 may determine which of the devices in the list of devices are compatible with the AR application at issue such that the AR application is configured to utilize those devices during an AR session. For example, one or more AR applications may be utilized by the user device 103. Example AR applications may include AR applications associated with games, learning systems, experiential systems, etc. Across AR applications, differing levels of AR functionality may be developed and that AR functionality may limit the types and/or number of devices that can be used during an AR session. For example, a given AR application may be configured to utilize light-emitting devices such as smart lights, but may not be configured to utilize image-output devices and/or audio-output devices. In other examples, the AR application may be configured to utilize some or all types of such devices. Characteristics data from the AR application may be received that indicates the configuration of the AR application, and this characteristics data may be utilized by the orchestrator 142 to determine a subset of the candidate devices that may be utilized during an AR session with the AR application.

At block 412, the orchestrator 142 may request device locations from a location component 146. For example, having determined which devices are to be associated with a given AR application and/or a given AR session, the orchestrator 142 may initiate a process of determining information that may be utilized during a given AR session to determine when to operate the devices. This may include determining location information for the devices.

At block 414, the location component 146 may determine device locations of the devices that were indicated by the device selection component 144 to be in the physical environment and for those devices that are compatible with the AR application at issue. For example, the location component 146 may be configured to determine locations of one or more of the subset of devices relative to each other and/or to the user device 103 at issue. For example, a number of techniques may be utilized to determine device locations relative to other devices in the physical environment. For example, RSSI data may be queried from one or more of the devices indicating signal strength as between any two devices. Increased signal strength may indicate devices are closer to each other than decreased signal strength. Additionally, when a voice interface device is situated in the physical environment, beamforming or other microphone-based techniques may be utilized to detect an orientation of a given device from the voice interface device. Additionally, when one or more of the devices includes a camera, image data from the camera and computer vision techniques may be utilized to detect item location and orientation. It should be understood that the use of image data from device cameras is only be performed when user consent to do so is provided. Additionally, when one or more of the devices includes radar-based technology, such as ultrasonic technology, this technology may be employed to detect location and orientation of devices in the physical environment.

At block 416, the location component 146 may return the device locations to the orchestrator 142. For example, the location component 146 may generate location data indicating the locations of the devices in question in the physical environment, and this location data may be sent from the location component 146 to the orchestrator 142 in response to the orchestrator's 142 request for location data. In examples, the location data may also include orientation of the devices in question. The location data may be utilized to determine a set of devices that are in the same environment as a user device and may exclude devices that are in other environment such as different rooms when doing so would be applicable to the AR application at issue.

At block 418, the orchestrator 142 may send device data and location data to a configuration component 148. For example, having received the device data from the device selection component 144 and the location data from the location component 146, the orchestrator 142 may send such data to the configuration component 148 for use by the configuration component 148 in generating configuration data.

At block 420, the configuration component may generate configuration data utilizing the device data and the location data. For example, the configuration data may indicate the subset of devices, device types of those devices, device capabilities, one or more applications utilized to control such devices, and communication data that may be utilized by the AR application to interface with the system to cause device state transitions when desired by the AR application. This communication data may include one or more APIs and/or other information that may be utilized by the AR application to request the device state transitions to occur. Additionally, the configuration data may include the location data, which may be formatted such that the AR application can determine when interactions in the AR environment correspond to the locations of the devices at issue. Some or all of this configuration data may be utilized by the AR application to determine when and how to utilize the devices in the physical environment during an AR session. By so doing, the devices in the physical environment may be setup for use by the AR application.

At block 422, the configuration component 148 may send the configuration data to the user device 103 such that the AR application associated with the user device 103 may utilize the devices in the physical environment during an AR session. For example, the AR application may utilize the configuration data to associate various portions of the AR environment with certain functionality of the devices at issue, and when events occur in the AR session, those events may trigger device state transitions to occur for the devices at issue.

At block 424, the orchestrator 142 may send a call to the device 103 and/or to the AR application that resides on another device to initiate an orchestration session. In this example, the initial user input may be to initiate the AR application and to cause an orchestration session to be established. Having determined the devices that will interact with the AR application as well as the location data for those devices, in examples, the AR application may have the information necessary to establish an AR session. The orchestrator 142 may call the AR application to establish that AR session such that an orchestrator of the system may communicate between the smart home systems described herein and the AR application to cause device state changes on smart home devices as part of the AR session. Examples of device state changes and events occurring in association with the AR environment to cause device state changes are described above with respect to FIGS. 2 and 3.

Figure 5:
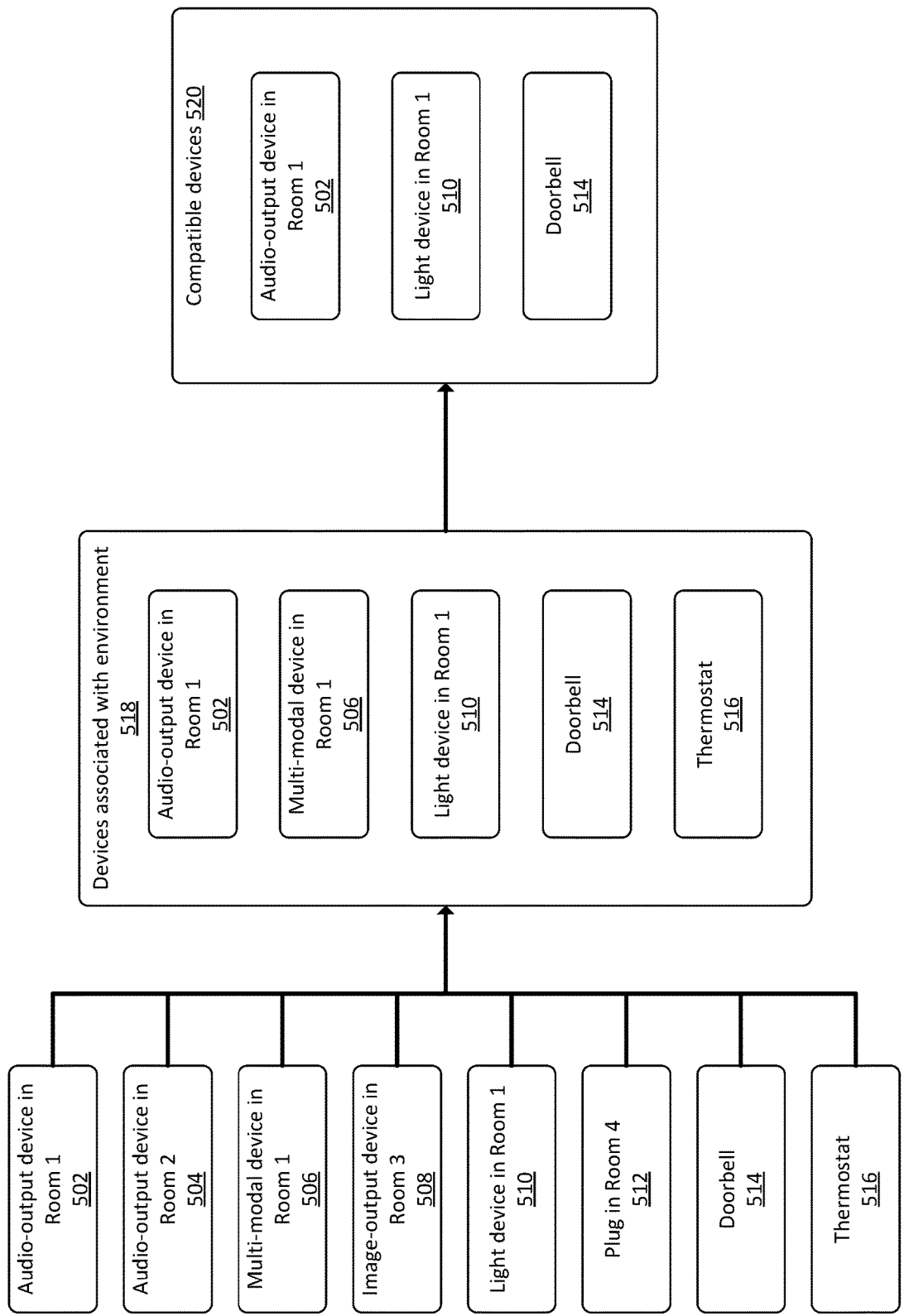
FIG. 5 illustrates a conceptual diagram of example device identifiers and components utilized for the selection of devices to be used during an AR session.

FIG. 5 illustrates a conceptual diagram of example device identifiers and components utilized for the selection of devices to utilize during an AR session. The devices described with respect to FIG. 5 may be the same or similar, and may perform the same or similar functionality, as the devices 102(*a*)-(*d*) described with respect to FIG. 1. As shown in FIG. 5, multiple devices may be associated with given account data. A device selection component, which may be the same or similar to the device selection component 144 described with respect to FIG. 1, may be utilized to determine which of those devices are candidate devices for inclusion in a given AR session and/or for association with a given AR application.

To start, as described more fully above with respect to FIG. 1, the device selection component may determine devices associated with the user account data at issue. As shown in FIG. 5, eight devices are determined to be associated with the user account data at issue. Those devices include an audio-output device in Room 1 502, an audio-output device in Room 2 504, a multi-modal device in Room 1 506, an image-output device in Room 3 508, a light device in Room 1 510, a plug in Room 4 512, a doorbell 514, and/or a thermostat 516. It should be understood that while several example device types are provided with respect to FIG. 5, the devices may be any device type that transitions device state. Additionally, while eight devices are shown in FIG. 5, the number of devices may be one, two, three, four, five, six, seven, eight, or more than eight. Additionally, while the devices are described as being associated with one or four possible rooms, it should be understood that the devices may be associated with a single room and/or any number of multiple rooms. Additionally, in examples, an environment indicator such as a room may be associated with given devices or the given devices may not include an environment indicator.

The device selection component described herein may be utilized to acquire data indicating the devices associated with a physical environment 518 in which a user device is situated for the purpose of initiating and/or running an AR session. For example, the device selection component may determine and/or receive data indicating that the user device at issue is located in a living room portion of a physical environment and that the living room corresponds to "Room 1." In this example, the device selection component may determine which of the devices associated with the user account data should be selected for inclusion as candidate devices to associate with an AR session and/or an AR application. In the example of FIG. 5, the device selection component may select the devices indicated as being associated with Room 1, here being the audio-output device in Room 1 502, the multi-modal device in Room 1 506, and the light device in Room 1 510. In addition, the device selection component may also select, as candidate devices, those devices that do not include a room indicator or otherwise that may be not associated with a specific portion of a physical environment. Those device may be, in the example of FIG. 5, the doorbell 514 and the thermostat 516.

Having determined the candidate devices from the total devices associated with given user account data, the device selection component may determine which of the candidate devices to associate with the AR session and/or AR application based at least in part on which devices are compatible with the AR application at issue. For example, one or more AR applications may be utilized by the user device. Example AR applications may include AR applications associated with games, learning systems, experiential systems, etc. Across AR applications, differing levels of AR functionality may be developed and that AR functionality may limit the types and/or number of devices that can be used during an AR session. For example, a given AR application may be configured to utilize light-emitting devices such as smart lights, but may not be configured to utilize image-output devices and/or audio-output devices. In other examples, the AR application may be configured to utilize some or all types of such devices. Characteristics data from the AR application may be received that indicates the configuration of the AR application, and this characteristics data may be utilized by an orchestrator to determine a subset of the candidate devices that may be utilized during an AR session with the AR application. In the example of FIG. 5, the compatible devices 520 may be the audio-output device in Room 1 502, the light device in Room 1 510, and the doorbell 514. In this situation, the AR application at issue may be configured to utilize these device types during an AR session. However, the AR application may not include functionality that allows for use of the multi-modal device in Room 1 506 or the thermostat 516, and thus those devices have, in this example, been excluded from the compatible devices 520.

Figure 6:
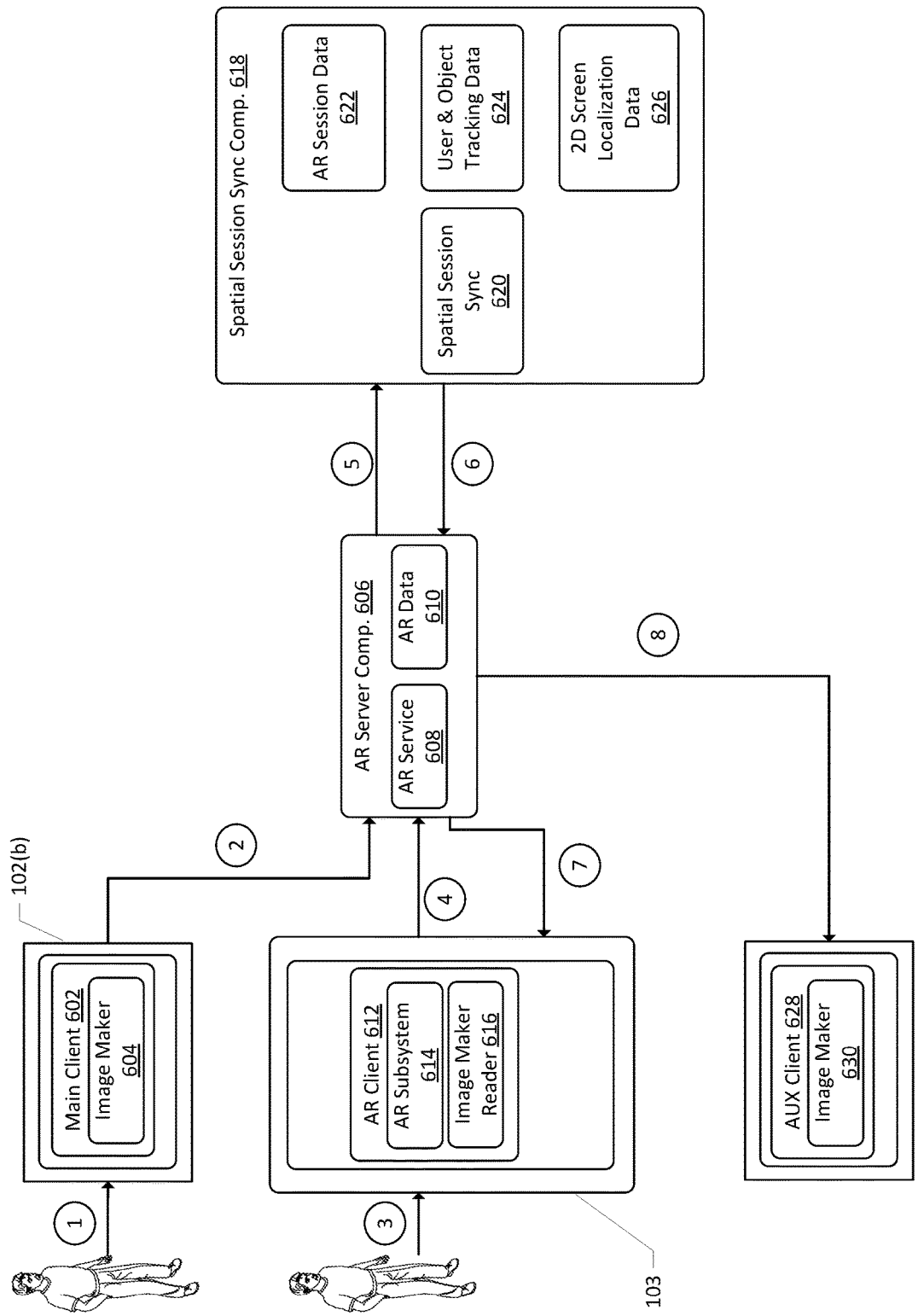
FIG. 6 illustrates a conceptual diagram of example components utilized for initiation of an AR session between multiple devices in a physical environment.

FIG. 6 illustrates a conceptual diagram of example components utilized for initiation of an AR session between multiple devices in a physical environment. FIG. 6 may include some of the same devices described with respect to FIG. 1, including one or more devices 102(*a*)-(*d*) and/or a user device 103. These devices 102(*a*)-(*d*), 103 may interact with one or more remote systems to initiate an AR session as described herein. FIG. 6 includes the depiction of 8 steps (steps 1-8). However, it should be understood that 8, more than 8, or less than 8 steps may be involved in the initiation of an AR session, and the order of steps 1-8 is provided by way of example only. Other orders and/or parallel processing of steps may be performed.

To start, at step 1, a user may provide user input to an image-output device 102(*b*) situated in a physical environment. In this example, the user input may be to enable an application running on the image-output device 102(*b*) and/or to enable an application available to the image-output device 102(*b*). The main client 602 may be enabled in response to the user input and this main client 602 may be configured to run a main AR session on the image-output device 102(*b*) during an AR session. An image maker 604 of the main client 602 may receive image data configured to be displayed on the image-output device 102(*b*) during an AR session and may perform operations necessary for display of corresponding images when appropriate.

At step 2, in response to the user input requesting to initiate an AR session, the main client 602 may send data to a remote system indicating that the user input has been received. The indication may provide information on the AR application to be utilized, the image-output device 102(*b*) that received the user input, and/or other information acquired by the main client 602. This data may be received at an AR server component 606, which may include an AR service 608 and AR data 610. The AR service 608 may receive the data from the image-output device 102(*b*) and may generate a session-initiation identifier for the AR session at issue. This session-initiation identifier may be associated with an identifier of the image-output device 102(*b*), and this data may be stored in association with the AR data 610.

In addition to initiating the AR session with the image-output device 102(*b*), at step 3, additional user input may be received at the user device 103 that is situated in the same physical environment as the image-output device 102(*b*). This additional user input may be an indicator that the user device 103 is to be associated with the AR session. In an example, a link, quick reference (QR) code, or other element may be displayed on the image-output device 102(*b*). The image maker 604 may be configured to generate and/or display an image of the element to be utilized by the user device 103. In this example, an AR client 612 may be running on the user device 103 and may include an AR subsystem 614 and an image maker reader 616. The AR subsystem 614 may be configured to display functionality for initiating the AR session on the user device 103 as well as for capturing an image or other data from the image-output device 102(*b*) to synchronize or otherwise associate those devices with each other for the AR session. The image maker reader 616 may receive image data, QR code data, or other data from the image rendered on the image-output device 102(*b*).

At step 4, the user device 103 may send the image data, QR code data, or other data as read by the image maker reader 616 to the AR server component 606. The AR service 608 may receive this data and may correlate that data with the data received from the image-output device 102(*b*) and/or the identifier information stored in the AR data 610. In this example, the AR service 608 may determine that the data from the user device 103 corresponds to the data from the image-output device 102(*b*) and/or that one or more conditions have been satisfied for associating those devices for purposes of the AR session.

At step 5, the AR server component 606 may communicate with a spatial session sync component 153. The spatial session sync component 153 may include a spatial session sync 620, AR session data 622, user and object tracking data 624, and/or two-dimensional (2D) screen localization data 626. The spatial session sync component 153 may be responsible for associating devices in the physical environment with functionality associated with the AR session. To do so, the AR session data 622 may be stored and may indicate virtual objects associated with the AR session, storylines, gameplay, and/or other interactions with the AR session at issue, and/or any other data indicating potential functionality of the devices and the AR environment during the AR session. The user and object tracking data 624 may indicate location information for the user device that is displaying the AR environment, location information for the one or more devices in the physical environment, and/or location information of the user and/or one or more virtual users in the physical environment. The 2D screen localization data 626 may generate and/or store data indicating where the image-output device 102(*b*) is located in association with the user device and/or one or more other devices in the physical environment. Some or all of the information from the AR session data 622, the user and object tracking data 624, and/or the 2D screen localization data 626 may be utilized by the spatial session sync 620 to generate the AR environment described herein and/or to place device representations of the devices in the AR environment.

At step 6, spatial sync data from the spatial session sync component 153 may be sent to the AR server component 606. The AR service 608 may receive the spatial sync data and may determine which devices to send the spatial sync data to. Those devices may include the image-output device 102(*b*) that initiated the request for the AR session as well as the user device 103 that is associated with the AR session. Additionally, if one or more other image-output device 102(*b*) and/or user devices 103 (including those operated by other users) are associated with the AR session, the spatial sync data may be sent to those devices as well.

At step 7, the AR server component 606 may send the spatial sync data to the AR client 612 on the user device 103 along with AR session data configured to cause the AR client 612 to display the AR environment on the user device 103. Additionally, at step 8, in some examples more than one image-output device 102(*b*) is situated in the physical environment in question. In these examples, the secondary image-output device 102(*b*) may include an auxiliary client 628 that runs an image maker 630. The image maker 630 of the auxiliary client 628 may receive image data and/or other data associated with the AR session from the AR server component 606 to cause display of images associated with the AR session. By so doing, synchronization of images associated with the AR session may be achieved across the various image-output devices 102(*b*) and the user device 103 during the AR session.

Figure 7:
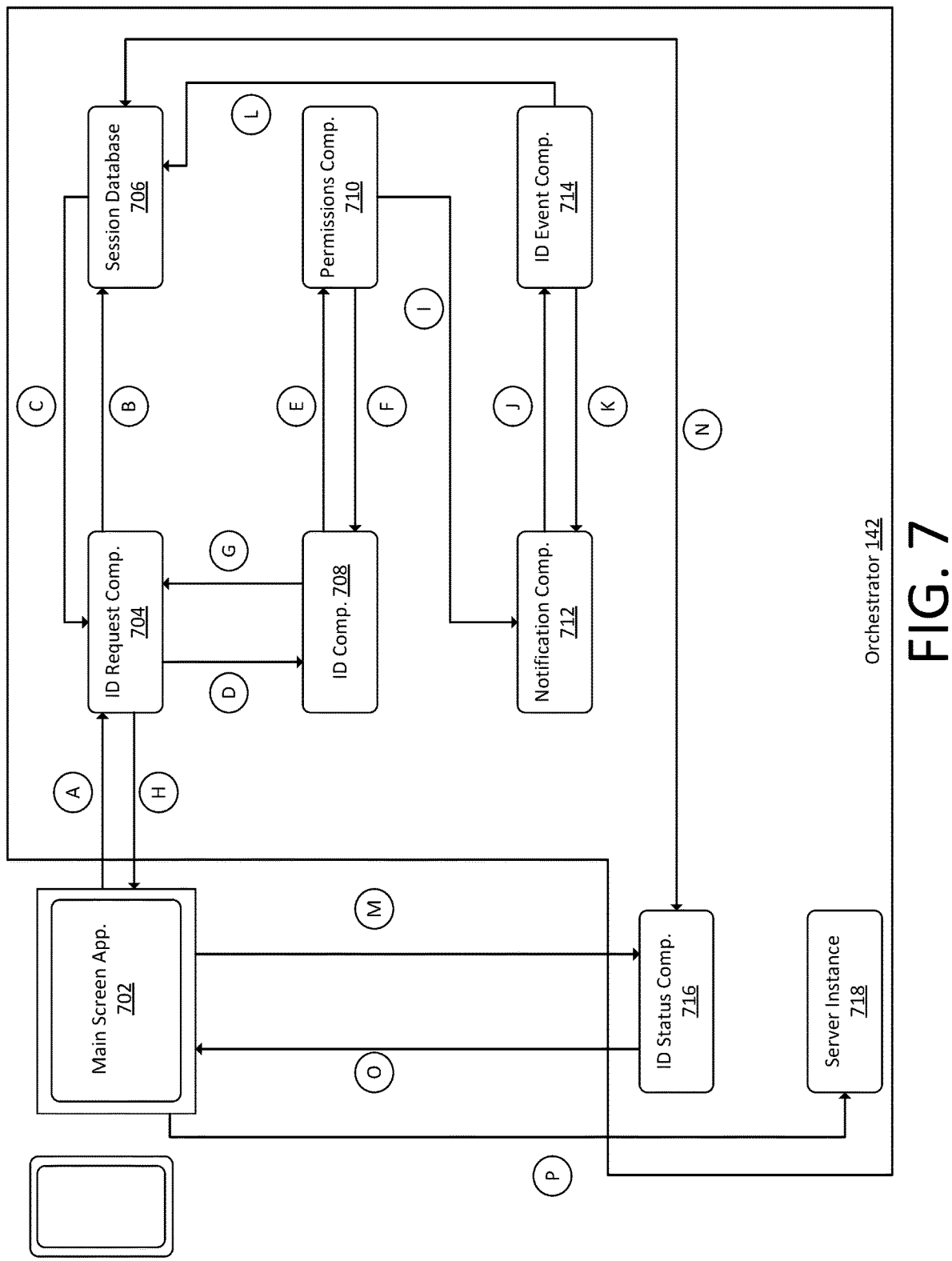
FIG. 7 illustrates a conceptual diagram of example components utilized for matching AR sessions and user devices to be associated with those AR sessions.

FIG. 7 illustrates a conceptual diagram of example components utilized for associating AR sessions and user devices to be associated with those AR sessions. FIG. 7 may include some of the same devices described with respect to FIG. 1, including one or more devices 102(*a*)-(*d*). These devices 102(*a*)-(*d*) may interact with one or more remote systems to associate AR sessions and user devices with those AR sessions. FIG. 7 includes the depiction of steps A-P. However, it should be understood more and/or or less steps may be involved in the processes described with respect to FIG. 7, and the order of steps A-P is provided by way of example only. Other orders and/or parallel processing of steps may be performed. The components described with respect to FIG. 7 may be components of the orchestrator 142 described in detail with respect to FIG. 1.

To start, at step A, a main screen application 702 may be caused to be displayed on an image-output device 102(*b*) in a physical environment where an AR session is occurring. The main screen application 702 send a request to create an AR environment or otherwise to initiate an AR session. At step B, an identification request component 704 may receive the request to create the AR environment and may write a new AR environment code and an AR environment identification ticket. The identification request component 704 may send the AR environment code and the AR environment identification ticket to a session database 706, which may store the received information to be queried by other components as described below. It should be understood that while the main screen application 702 is shown as being executed in association with a given device, the main screen application 702 may be executed on any number of devices, including user devices as described herein.

At step C, the session database 706 may send AR environment codes that are currently in use to the identification request component 704. In certain examples, the AR environment codes currently in user may already correspond to an AR environment code for the requested AR session. This may indicate that the AR session is already created and in use. In these examples, the identification request component 704 may return data indicating the AR environment has already been created and is in use.

At step D, the identification request component 704 may send the AR environment ticket to an identification component 708. The identification component 708 may queue the AR environment ticket and may request, at step E, AR session identification information from a permissions component 710. The permissions component 710 may receive the AR environment ticket and determine whether the account associated with the request and/or the devices associated with the request are permitted to be associated with the AR session at issue. The permissions component 710, at step F, may send response data to the identification component 708, indicating whether permissions for the account(s) and/or device(s) requesting the AR environment have been provided.

In instances where permissions for the account(s) and/or device(s) are returned to the identification component 708, at step G, the identification request component 704 may receive the AR environment ticket back from the identification component 708 with the indication of the permissions associated therewith. At step H, the identification request component 704 may send the AR environment code and the AR environment ticket back to the main screen application 702, which may utilize the AR environment code and the AR environment ticket to create the AR environment described herein and/or to display the AR environment on a display of the device.

Additionally, at step I, the permissions component 710 may send events data to a notification component 712, where the events data may indicate the AR environment ticket that was published in association with the AR session. At step J, the notification component 712 may utilize the AR environment ticket to send a notification to an identification event component 714. The identification event component 714 may generate an identification event for the AR environment in question and, at step K, may return a subscription response to the notification component 712. If the subscription response indicates that the identification event is still pending and as such an AR session is authorized to be established, the notification component 712 may utilize such a response to inform the main screen application 702 that associated permissions and the identification event are present and support establishment of the AR session. The subscription response may indicate that the identification event has been created and associated with the AR environment that was created. The identification event component 714 may also, at step K, write an identification status for the AR environment ticket to the session database 706.

At step M, the main screen application 702 may request an identification status from an identification status component 714. The identification status component 716, having received the request for the identification status, may, at step N, query the session database 706 for the identification status that corresponds to the AR environment in question. The identification status may be returned to the identification status component 716 at step O, which may return identification information associated with the identified AR environment to the main screen application 702. The identification information may include an internet protocol address, a port address, and/or a session identifier associated with the AR environment. At step P, the main screen application 702 may send a connection request to a server instance 718 hosting the AR environment such that the main screen application 702 may connect to the AR session and display the AR environment.

In addition to creating an AR environment as described above, requests to join the AR environment, such as by one or more user devices may also utilize one or more of the components described above with join the AR environment. A series of AR environment codes, tickets, and identification events may be determined from the various components described with respect to FIG. 7, to determine if the user device in question is authorized to join a given AR session and how that user device is to join the AR session.

Figure 8:
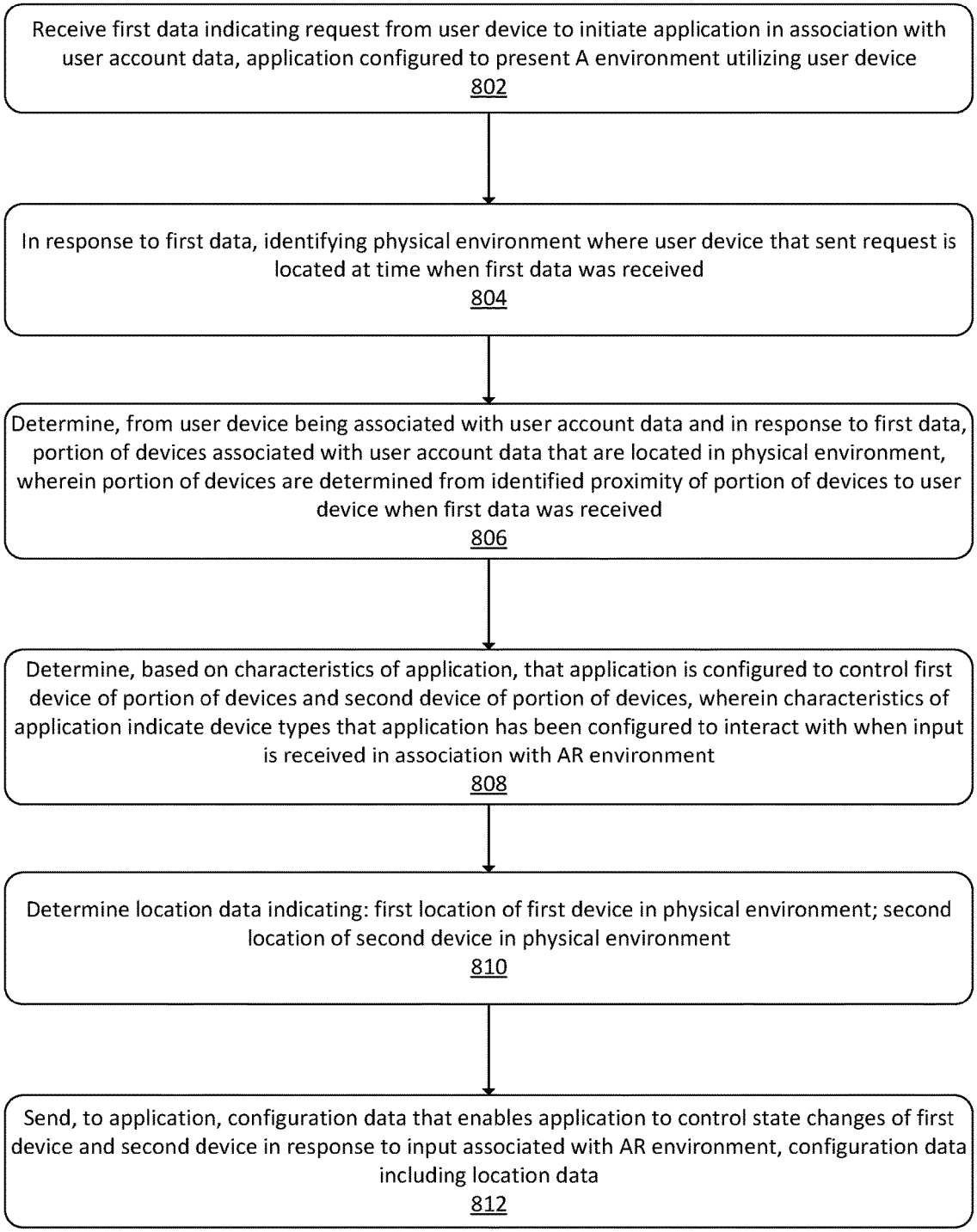
FIG. 8 illustrates a flow diagram of an example process for device integration with AR environments.
Figure 9:
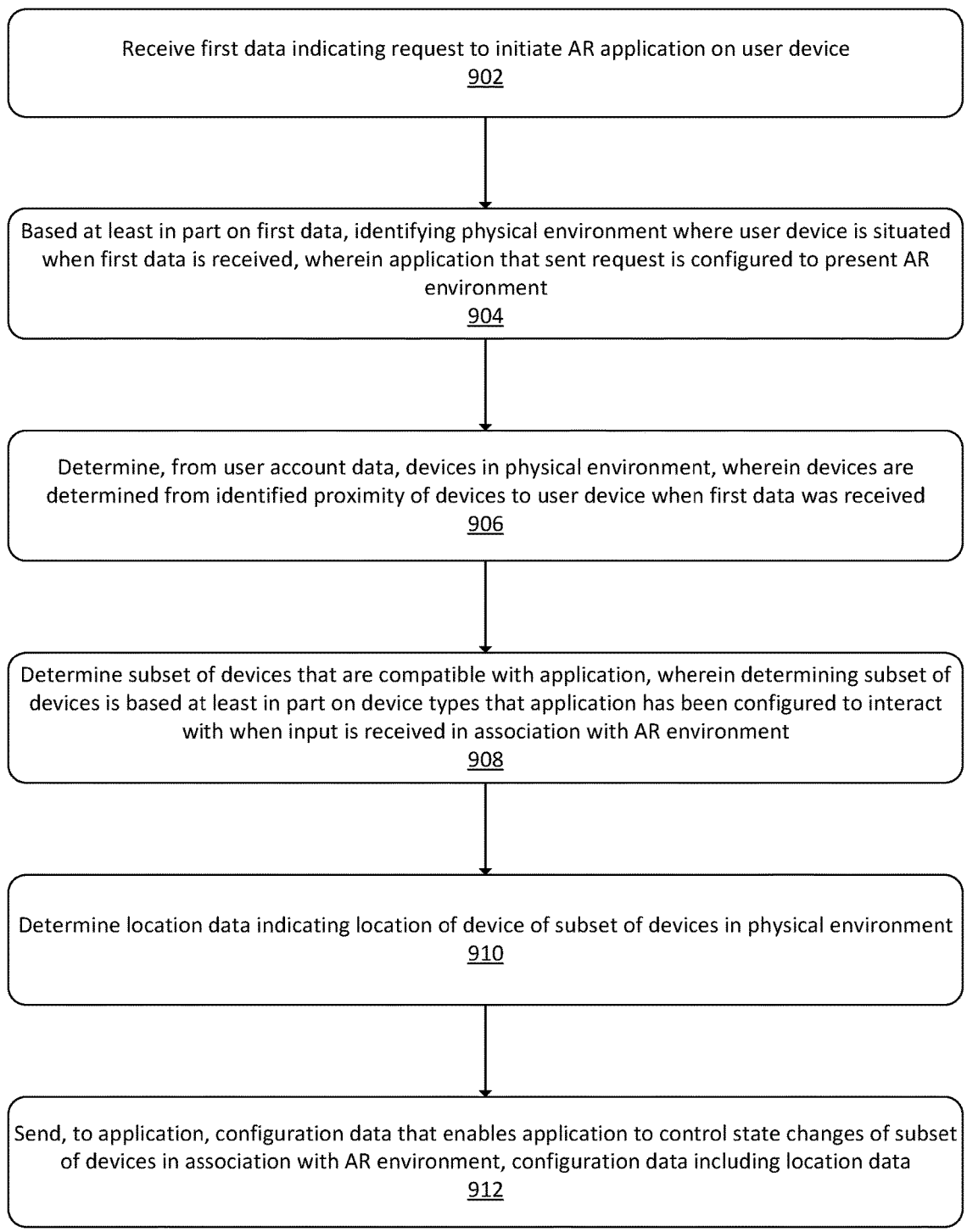
FIG. 9 illustrates a flow diagram of another example process for device integration with AR environments.

FIGS. 8 and 9 illustrates processes for device integration with AR environments. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-7, 10, and 11, although the processes may be implemented in a wide variety of other environments, architectures and systems.

FIG. 8 illustrates a flow diagram of an example process 800 for device integration with AR environments. The order in which the operations or steps are described is not intended to be construed as a limitation, and any number of the described operations may be combined in any order and/or in parallel to implement process 800.

At block 802, the process 800 may include receiving first data indicating a request from a user device to initiate an application in association with user account data, the application configured to present an AR environment utilizing the user device. For example, a user may have a user device with an AR application installed thereon or otherwise may have access to an AR application that is not necessarily stored on the user device. The user may provide user input to the user device indicating an intent to initiate the AR application. The user device may communicate with one or more other devices, which may be remote from the user device, to initiate the AR session and cause the user device to display the AR environment on a display of the user device. Generally, the user would view the AR environment by moving the user device around a given physical environment, and a camera of the user device would capture images of the physical environment and display those images, typically in a live-feed manner, on the display of the user device. In addition, one or more virtual objects may be presented on the display. The images of the physical environment along with the virtual objects together may form the AR environment that the user may view using the display of the user device. In some AR applications, the displayed virtual objects may be based on locations of physical objects in the physical environment, such as when a virtual person is displayed at a location that corresponds to a floor portion of the physical environment.

At block 804, the process 800 may include, in response to the first data, identifying a physical environment where the user device that sent the request is located at a time when the first data was received. For example, environmental data may be any data that may be utilized to detect where the user device is situated, but by way of example may include global positioning data, RSSI data, image data that is analyzed such as via computer vision processing, etc. Additional details on identifying the physical environment where the user device is situated is provided above with respect to the device selection component 144 in FIG. 1.

At block 806, the process 800 may include determining, from the user device being associated with the user account data and in response to the first data, a portion of devices associated with the user account data that are located in the physical environment, wherein the portion of the devices are determined from an identified proximity of the portion of the devices to the user device when the first data was received. For example, a device selection component may be configured to determine what devices are physically present in the physical environment and can be utilized during AR sessions, as described in more detail with respect to FIGS. 4 and 5 above. In examples, the device selection component may receive an identifier of the user device, an identifier of a companion application associated with the system that is installed on the user device, identifiers of other devices such as voice interface devices that are in short-range communication with the user device, an identifier of a wireless network identifier currently associated with the user device, and/or other identification data that the device selection component may utilize to determine what environment the user device is currently situated in. The device selection component may then utilize this identifying information to determine devices that are associated with user account data for the physical environment. Take, for example, a home that has multiple smart lights, multiple smart speakers, televisions, appliances, and other devices. Each of these devices may have been previously associated with user account data, such as by wireless discovery of such devices, control of such devices using voice input and/or input to a graphical user interface of a user device, etc. The device selection component may identify these devices and determine that such devices are to be associated with the physical environment for use during an AR session.

In other examples, additional operations may be performed to determine which of the devices associated with user account data are to be considered candidate devices for an AR session. For example, environmental data may be received from the user device and/or other devices in the physical environment that may indicate which room or otherwise portion of a physical environment the user device is situated in when the request to initiate the AR session is received. By way of example, the user device may be situated in a living room of a physical environment and the living room may include only a portion of the devices associated with the user account data. The user account data itself may also be utilized to identify devices associated with a given room or otherwise portion of the physical environment. For example, if the device selection component determines that the user device is located in a living room of the physical environment, device naming indicators, device group names, device affinity data, and/or other data showing prior interactions of the various devices may be utilized to determine what other devices are likely situated in the living room.

At block 808, the process 800 may include determining, based on characteristics of the application, that the application is configured to control a first device of the portion of the devices and a second device of the portion of the devices, wherein the characteristics of the application indicate device types that the application has been configured to interact with when input is received in association with the AR environment. For example, one or more AR applications may be utilized by the user device. Example AR applications may include AR applications associated with games, learning systems, experiential systems, etc. Across AR applications, differing levels of AR functionality may be developed and that AR functionality may limit the types and/or number of devices that can be used during an AR session. For example, a given AR application may be configured to utilize light-emitting devices such as smart lights, but may not be configured to utilize image-output devices and/or audio-output devices. In other examples, the AR application may be configured to utilize some or all types of such devices. Characteristics data from the AR application may be received that indicates the configuration of the AR application, and this characteristics data may be utilized by the device selection component to determine a subset of the candidate devices that may be utilized during an AR session with the AR application.

At block 810, the process 800 may include determining location data indicating: a first location of the first device in the physical environment; and a second location of the second device in the physical environment. For example, a number of techniques may be utilized to determine device locations relative to other devices in the physical environment. For example, RSSI data may be queried from one or more of the devices indicating signal strength as between any two devices. Increased signal strength may indicate devices are closer to each other than decreased signal strength. Additionally, when a voice interface device is situated in the physical environment, beamforming or other microphone-based techniques may be utilized to detect an orientation of a given device from the voice interface device. Additionally, when one or more of the devices includes a camera, image data from the camera and computer vision techniques may be utilized to detect item location and orientation. It should be understood that the use of image data from device cameras is only be performed when user consent to do so is provided. Additionally, when one or more of the devices includes radar-based technology, such as ultrasonic technology, this technology may be employed to detect location and orientation of devices in the physical environment.

At block 812, the process 800 may include sending, to the application, configuration data that enables the application to control state changes of the first device and the second device in response to the input associated with the AR environment, the configuration data including the location data. For example, configuration data may indicate the subset of devices, device types of those devices, device capabilities, one or more applications utilized to control such devices, and communication data that may be utilized by the AR application to interface with the system to cause device state transitions when desired by the AR application. This communication data may include one or more APIs and/or other information that may be utilized by the AR application to request the device state transitions to occur. Additionally, the configuration data may include the location data, which may be formatted such that the AR application can determine when interactions in the AR environment correspond to the locations of the devices at issue. Some or all of this configuration data may be utilized by the AR application to determine when and how to utilize the devices in the physical environment during an AR session. By so doing, the devices in the physical environment may be setup for use by the AR application.

Additionally, or alternatively, the process 800 may include receiving, from the AR application, request data to cause a state change of the light-emitting device in response to an event in the AR environment occurring during the AR session, the event associated with the first location of the light-emitting device in the physical environment. The process 800 may also include sending a directive to the light-emitting device in response to the request data, the directive causing the light-emitting device to transition from a first state to a second state such that the light-emitting device operates in the second state in the physical environment and a representation of the second state of the light-emitting device is presented in the AR environment.

Additionally, or alternatively, the process 800 may include receiving, from the AR application, request data to cause a state change of the audio-output device in response to an event in the AR environment occurring during the AR session, the event associated with the second location of the audio-output device in the physical environment. The process 800 may also include sending a directive to the audio-output device in response to the request data, the directive causing the audio-output device to transition from a first state to a second state such that the audio-output device outputs audio in the physical environment.

Additionally, or alternatively, the process 800 may include receiving, from the AR application, an indication that the third location of the image-output device is within a field of view of a camera of the user device such that the image-output device is presented on the user device in association with the AR environment. The process 800 may also include determining an image to be displayed on the image-output device from data received from the AR application indicating an interaction of a user with the AR environment. The process 800 may also include sending a directive to the image-output device in response to receiving the indication, the directive causing the image-output device to display the image in the physical environment.

Additionally, or alternatively, the process 800 may include determining, utilizing data indicating distances between the user device and the portion of the devices, a reference device that is proximate to the user device. The process 800 may also include determining, from prior interaction information from the user account data, that the reference device is historically utilized in association with the portion of the devices. In these examples, determining the portion of the devices may be in response to the reference device being historically utilized in association with the portion of the devices.

Additionally, or alternatively, the process 800 may include receiving, from the user device, first image data corresponding to a field of view of a camera of the user device. The process 800 may also include identifying, utilizing computer vision processing, the first device as depicted in the first image data. The process 800 may also include sending, to the application, an indication that the first device is being viewed by the user device in association with the AR environment. The process 800 may also include receiving, from the application, second image data to be displayed on the first device while the first device is being viewed by the user device in association with the AR environment. The process 800 may also include sending a directive to the first device, the directive configured to cause the first device to display an image corresponding to the second image data while the first device is being viewed by the user device in association with the AR environment.

FIG. 9 illustrates a flow diagram of another example process 900 for device integration with AR environments. The order in which the operations or steps are described is not intended to be construed as a limitation, and any number of the described operations may be combined in any order and/or in parallel to implement process 900.

At block 902, the process 900 may include receiving first data indicating a request to initiate an AR application on a user device. For example, a user may have a user device with an AR application installed thereon or otherwise may have access to an AR application that is not necessarily stored on the user device. The user may provide user input to the user device indicating an intent to initiate the AR session. The user device may communicate with one or more other devices, which may be remote from the user device, to initiate the AR session and cause the user device to display the AR environment on a display of the user device. Generally, the user would view the AR environment by moving the user device around a given physical environment, and a camera of the user device would capture images of the physical environment and display those images, typically in a live-feed manner, on the display of the user device. In addition, one or more virtual objects may be presented on the display. The images of the physical environment along with the virtual objects together may form the AR environment that the user may view using the display of the user device. In some AR applications, the displayed virtual objects may be based on locations of physical objects in the physical environment, such as when a virtual person is displayed at a location that corresponds to a floor portion of the physical environment.

At block 904, the process 900 may include, based at least in part on the first data, identifying a physical environment where the user device is situated when the first data is received, wherein the application that sent the request is configured to present an AR environment. For example, environmental data may be any data that may be utilized to detect where the user device is situated, but by way of example may include global positioning data, RSSI data, image data that is analyzed such as via computer vision processing, etc.

At block 906, the process 900 may include determining, from user account data, devices in the physical environment, wherein the devices are determined from an identified proximity of the devices to the user device when the first data was received. For example, a device selection component may be configured to determine what devices are physically present in the physical environment and can be utilized during AR sessions. In examples, the device selection component may receive an identifier of the user device, an identifier of a companion application associated with the system that is installed on the user device, identifiers of other devices such as voice interface devices that are in short-range communication with the user device, an identifier of a wireless network identifier currently associated with the user device, and/or other identification data that the device selection component may utilize to determine what environment the user device is currently situated in. The device selection component may then utilize this identifying information to determine devices that are associated with user account data for the physical environment. Take, for example, a home that has multiple smart lights, multiple smart speakers, televisions, appliances, and other devices. Each of these devices may have been previously associated with user account data, such as by wireless discovery of such devices, control of such devices using voice input and/or input to a graphical user interface of a user device, etc. The device selection component may identify these devices and determine that such devices are to be associated with the physical environment for use during an AR session.

In other examples, additional operations may be performed to determine which of the devices associated with user account data are to be considered candidate devices for an AR session. For example, environmental data may be received from the user device and/or other devices in the physical environment that may indicate which room or otherwise portion of a physical environment the user device is situated in when the request to initiate the AR session is received. By way of example, the user device may be situated in a living room of a physical environment and the living room may include only a portion of the devices associated with the user account data. The user account data itself may also be utilized to identify devices associated with a given room or otherwise portion of the physical environment. For example, if the device selection component determines that the user device is located in a living room of the physical environment, device naming indicators, device group names, device affinity data, and/or other data showing prior interactions of the various devices may be utilized to determine what other devices are likely situated in the living room.

At block 908, the process 900 may include determining a subset of the devices that are compatible with the application, wherein determining the subset of the devices is based at least in part on device types that the application has been configured to interact with when input is received in association with the AR environment. For example, one or more AR applications may be utilized by the user device. Example AR applications may include AR applications associated with games, learning systems, experiential systems, etc. Across AR applications, differing levels of AR functionality may be developed and that AR functionality may limit the types and/or number of devices that can be used during an AR session. For example, a given AR application may be configured to utilize light-emitting devices such as smart lights, but may not be configured to utilize image-output devices and/or audio-output devices. In other examples, the AR application may be configured to utilize some or all types of such devices. Characteristics data from the AR application may be received that indicates the configuration of the AR application, and this characteristics data may be utilized by the device selection component to determine a subset of the candidate devices that may be utilized during an AR session with the AR application.

At block 910, the process 900 may include determining location data indicating a location of a device of the subset of devices in the physical environment. For example, a number of techniques may be utilized to determine device locations relative to other devices in the physical environment. For example, RSSI data may be queried from one or more of the devices indicating signal strength as between any two devices. Increased signal strength may indicate devices are closer to each other than decreased signal strength. Additionally, when a voice interface device is situated in the physical environment, beamforming or other microphone-based techniques may be utilized to detect an orientation of a given device from the voice interface device. Additionally, when one or more of the devices includes a camera, image data from the camera and computer vision techniques may be utilized to detect item location and orientation. It should be understood that the use of image data from device cameras is only be performed when user consent to do so is provided. Additionally, when one or more of the devices includes radar-based technology, such as ultrasonic technology, this technology may be employed to detect location and orientation of devices in the physical environment.

At block 912, the process 900 may include sending, to the application, configuration data that enables the application to control state changes of the subset of devices in association with the AR environment, the configuration data including the location data. For example, configuration data may indicate the subset of devices, device types of those devices, device capabilities, one or more applications utilized to control such devices, and communication data that may be utilized by the AR application to interface with the system to cause device state transitions when desired by the AR application. This communication data may include one or more APIs and/or other information that may be utilized by the AR application to request the device state transitions to occur. Additionally, the configuration data may include the location data, which may be formatted such that the AR application can determine when interactions in the AR environment correspond to the locations of the devices at issue. Some or all of this configuration data may be utilized by the AR application to determine when and how to utilize the devices in the physical environment during an AR session. By so doing, the devices in the physical environment may be setup for use by the AR application.

Additionally, or alternatively, the process 900 may include receiving, from the AR application, an indication of an event occurring in the AR environment during the AR session, the event associated with the location of the device in the physical environment. The process 900 may also include sending a directive to the device based at least in part on receiving the indication, the directive causing the device to transition from a first light-emission state to a second light-emission state such that the device operates in the second light-emission state in the physical environment and a representation of the second light-emission state of the device is presented in the AR environment.

Additionally, or alternatively, the process 900 may include receiving, from the AR application, an indication of an event occurring in the AR environment during the AR session, the event associated with the location of the device in the physical environment. The process 900 may also include sending a directive to the device based at least in part on receiving the indication, the directive causing the device to transition from a first state to a second state such that the device outputs audio associated with the event in the physical environment.

Additionally, or alternatively, the process 900 may include receiving, from the AR application, an indication of an event occurring in the AR environment during the AR session, the event associated with the location of the device in the physical environment. The process 900 may also include sending a directive to the device based at least in part on receiving the indication, the directive causing the device to display an image associated with the event in the physical environment.

Additionally, or alternatively, the process 900 may include determining, utilizing data indicating distances between the user device and the devices, a reference device that is proximate to the user device. The process 900 may also include determining, based at least in part on prior interaction information from the user account data, that the proximate device is historically utilized in association with the devices. In these examples, determining the devices that are disposed within the physical environment may be based at least in part on the proximate device being historically utilized in association with the devices.

Additionally, or alternatively, the process 900 may include receiving, from the user device, first image data corresponding to a field of view of a camera of the user device. The process 900 may also include identifying, utilizing computer vision techniques, the device as depicted in the first image data. The process 900 may also include sending, to the AR application, an indication that the device is being viewed by the user device in association with the AR session. The process 900 may also include receiving, from the AR application, second image data to be displayed on the device while the device is being viewed by the user device in association with the AR session. The process 900 may also include sending a directive to the device, the directive configured to cause the device to display an image corresponding to the second image data while the device is being viewed by the user device in association with the AR session.

Additionally, or alternatively, the process 900 may include receiving, from the AR application: user input data indicating a user interaction with the user device during the AR session to cause a virtual object displayed in the AR environment to be displayed on the device; image data corresponding to the virtual object; and audio data associated with the virtual object. The process 900 may also include sending a directive to the device, the directive causing: the virtual object to be displayed on a screen of the device based at least in part on the user input data; and audio corresponding to the audio data to be output by a speaker of the device.

Additionally, or alternatively, the process 900 may include determining, based at least in part on the device types that the application has been configured to interact with, that at least one device having a device type of the device types is unassociated with the physical environment but is associated with the user account data. The process 900 may also include causing the at least one device to be included in the subset of devices.

Additionally, or alternatively, the process 900 may include receiving, from the application, user input data indicating a selection of a functionality of multiple functionalities associated with the AR environment. The process 900 may also include causing at least one device of the subset of devices to be removed from the subset of devices based at least in part on the user input data.

Additionally, or alternatively, the process 900 may include receiving, from the user device, first image data representing a first image of the device within a field of view of a camera of the user device. The process 900 may also include identifying, utilizing computer vision techniques, a second image being depicted on the device. The process 900 may also include causing a third image to be displayed on the user device in association with the AR environment based at least in part on the second image being depicted on the device.

Figure 10:
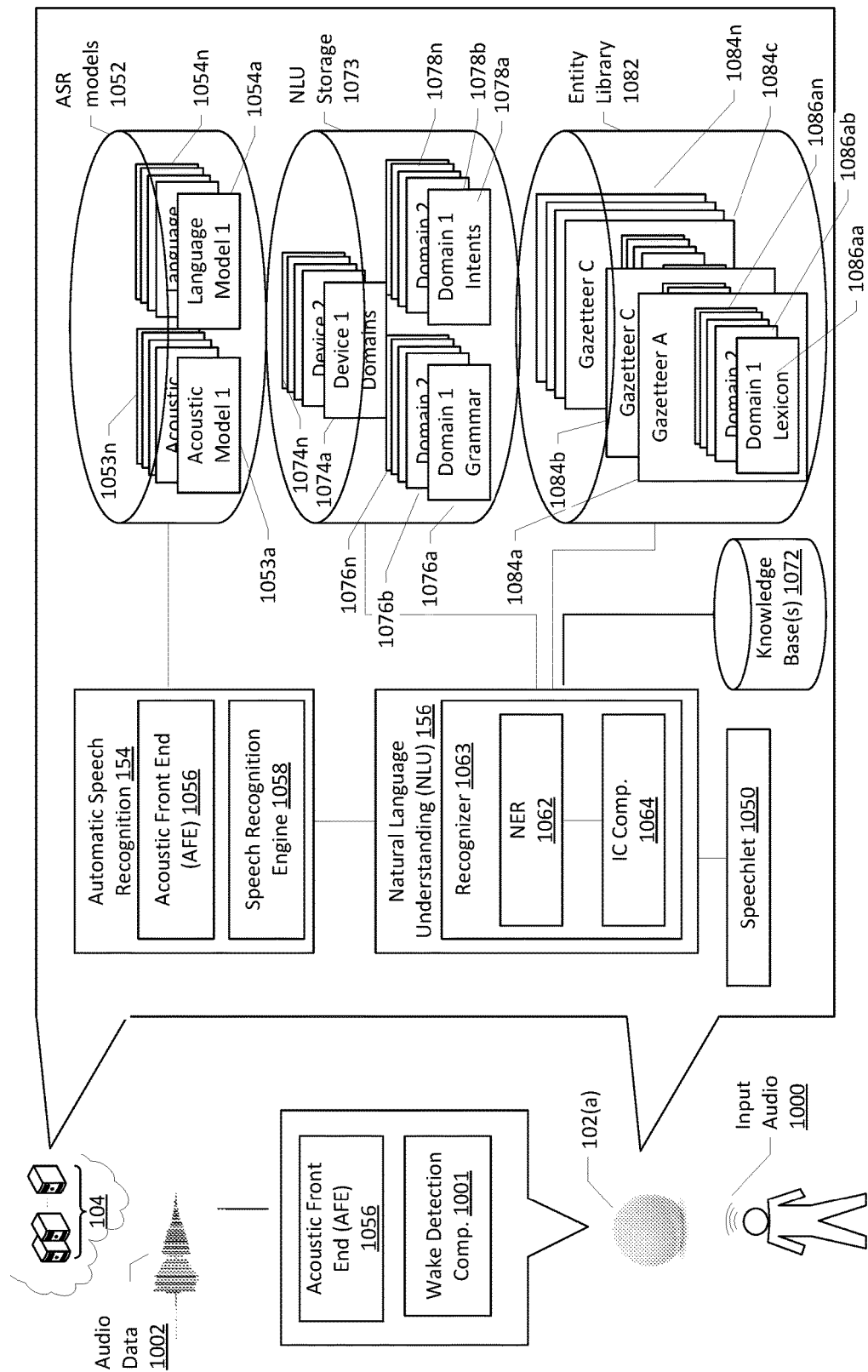
FIG. 10 illustrates a conceptual diagram of components of a speech-processing system for processing audio data provided by one or more devices.

FIG. 10 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin processing audio data). The various components illustrated may be located on a same device or different physical devices. Message between various components illustrated in FIG. 10 may occur directly or across a network 106. An audio capture component, such as a microphone 128 of the device 102(*a*)-(*d*), or another device, captures audio 1000 corresponding to a spoken utterance. The device 102(*a*)-(*d*), using a wake word engine 1001, then processes audio data corresponding to the audio 1000 to determine if a keyword (such as a wakeword) is detected in the audio data. Following detection of a wakeword, the device 102(*a*)-(*d*) processes audio data 1002 corresponding to the utterance utilizing an ASR component 154. The audio data 1002 may be output from an optional acoustic front end (AFE) 1056 located on the device prior to transmission. In other instances, the audio data 1002 may be in a different form for processing by a remote AFE 1056, such as the AFE 1056 located with the ASR component 154.

The wake word engine 1001 works in conjunction with other components of the user device, for example a microphone to detect keywords in audio 1000. For example, the device may convert audio 1000 into audio data, and process the audio data with the wake word engine 1001 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 1001 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake word engine 1001 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102(a)-(d) may "wake." The audio data 1002 may include data corresponding to the wakeword. Further, a local device may "wake" upon detection of speech/spoken audio above a threshold, as described herein. An ASR component 154 may convert the audio data 1002 into text. The ASR transcribes audio data into text data representing the words of the speech contained in the audio data 1002. The text data may then be used by other components for various purposes, such as executing system commands, inputting data, etc. A spoken utterance in the audio data is input to a processor configured to perform ASR which then interprets the utterance based on the similarity between the utterance and pre-established language models 1054 stored in an ASR model knowledge base (ASR Models Storage 1052). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1053 stored in an ASR Models Storage 1052), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 154 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1056 and a speech recognition engine 1058. The acoustic front end (AFE) 1056 transforms the audio data from the microphone into data for processing by the speech recognition engine 1058. The speech recognition engine 1058 compares the speech recognition data with acoustic models 1053, language models 1054, and other data models and information for recognizing the speech conveyed in the audio data. The AFE 1056 may reduce noise in the audio data and divide the digitized audio data into frames representing time intervals for which the AFE 1056 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1058 may process the output from the AFE 1056 with reference to information stored in speech/model storage (1052). Alternatively, post front-end processed data (such as feature vectors) may be received by the device executing ASR processing from another source besides the internal AFE. For example, the user device may process audio data into feature vectors (for example using an on-device AFE 1056).

The speech recognition engine 1058 attempts to match received feature vectors to language phonemes and words as known in the stored acoustic models 1053 and language models 1054. The speech recognition engine 1058 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, start AR session" The wake detection component may identify the wake word, otherwise described as a trigger expression, "Alexa," in the user utterance and may "wake" based on identifying the wake word. The speech recognition engine 1058 may identify, determine, and/or generate text data corresponding to the user utterance, here "start AR session."

The speech recognition engine 1058 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1058 to other processing components, which may be local to the device performing ASR and/or distributed across the network(s). For example, ASR results in the form of a single textual representation of the speech, an N-best list including multiple hypotheses and respective scores, lattice, etc. may be utilized, for natural language understanding (NLU) processing, such as conversion of the text into commands for execution, by the user device and/or by another device (such as a server running a specific application like a search engine, etc.).

The device performing NLU processing 156 may include various components, including potentially dedicated processor(s), memory, storage, etc. As shown in FIG. 10, an NLU component 156 may include a recognizer 1063 that includes a named entity recognition (NER) component 1062 which is used to identify portions of query text that correspond to a named entity that may be recognizable by the system. A downstream process called named entity resolution links a text portion to a specific entity known to the system. To perform named entity resolution, the system may utilize gazetteer information (1084a-1084n) stored in entity library storage 1082. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 154 based on the utterance input audio 1000) and attempts to make a semantic interpretation of the text. That is, the NLU process determines the meaning behind the text based on the individual words and then implements that meaning. NLU processing 156 interprets a text string to derive an intent or a desired action from the user as well as the pertinent pieces of information in the text that allow a device (e.g., device 102(*a*)-(*d*)) to complete that action. For example, if a spoken utterance is processed using ASR 154 and outputs the text "start AR session" the NLU process may determine that the user intended to initiate an AR session in association with one or more devices.

The NLU 156 may process several textual inputs related to the same utterance. For example, if the ASR 154 outputs N text segments (as part of an N-best list), the NLU may process all N outputs to obtain NLU results.

As will be discussed further below, the NLU process may be configured to parse and tag to annotate text as part of NLU processing. For example, for the text "start AR session," "initiate augmented reality session" may be tagged as a command (to initiate a process for starting an AR session on one or more devices).

To correctly perform NLU processing of speech input, an NLU process 154 may be configured to determine a "domain" of the utterance so as to determine and narrow down which services offered by the endpoint device may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 1062 receives a query in the form of ASR results and attempts to identify relevant grammars and lexical information that may be used to construe meaning. To do so, the NLU component 142 may begin by identifying potential domains that may relate to the received query. The NLU storage 1073 includes a database of devices (1074a-1074n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," health care," "smart home," "communications," "shopping," "music," "calendaring," etc. As such, each domain may be associated with a particular recognizer 1063, language model and/or grammar database (1076a-1076n), a particular set of intents/actions (1078a-1078n), and a particular personalized lexicon (1086). Each gazetteer (1084a-1084n) may include domain-indexed lexical information associated with a particular user and/or device. For example, the Gazetteer A (1084a) includes domain-index lexical information 1086aa to 1086an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 1064 parses the query to determine an intent or intents for each identified domain, where the intent corresponds to the action to be performed that is responsive to the query. Each domain is associated with a database (1078a-1078n) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 1064 identifies potential intents for each identified domain by comparing words in the query to the words and phrases in the intents database 1078. In some instances, the determination of an intent by the IC component 1064 is performed using a set of rules or templates that are processed against the incoming text to identify a matching intent.

In order to generate a particular interpreted response, the NER 1062 applies the grammar models and lexical information associated with the respective domain to actually recognize a mention of one or more entities in the text of the query. In this manner, the NER 1062 identifies "slots" or values (i.e., particular words in query text) that may be needed for later command processing. Depending on the complexity of the NER 1062, it may also label each slot with a type of varying levels of specificity (such as noun, place, device name, device location, city, artist name, song name, amount of time, timer number, or the like). Each grammar model 1076 includes the names of entities (i.e., nouns) commonly found in speech about the particular domain (i.e., generic terms), whereas the lexical information 1086 from the gazetteer 1084 is personalized to the user(s) and/or the device. For instance, a grammar model associated with the shopping domain may include a database of words commonly used when people discuss shopping.

The intents identified by the IC component 1064 are linked to domain-specific grammar frameworks (included in 1076) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "purchase" is an identified intent, a grammar (1076) framework or frameworks may correspond to sentence structures such as "purchase item called 'Item A' from Marketplace A."

For example, the NER component 1062 may parse the query to identify words as subject, object, verb, preposition, etc., based on grammar rules and/or models, prior to recognizing named entities. The identified verb may be used by the IC component 1064 to identify intent, which is then used by the NER component 1062 to identify frameworks. A framework for the intent of "play a song," meanwhile, may specify a list of slots/fields applicable to play the identified "song" and any object modifier (e.g., specifying a music collection from which the song should be accessed) or the like. The NER component 1062 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 1062 may search the database of generic words associated with the domain (in the knowledge base 1072). So, for instance, if the query was "identify this song," after failing to determine which song is currently being output, the NER component 1062 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to a speechlet 1050. The destination speechlet 1050 may be determined based on the NLU output. For example, if the NLU output includes a command to send a message, the destination speechlet 1050 may be a message sending application, such as one located on the user device or in a message sending appliance, configured to execute a message sending command. If the NLU output includes a search request, the destination application may include a search engine processor, such as one located on a search server, configured to execute a search command. After the appropriate command is generated based on the intent of the user, the speechlet 1050 may provide some or all of this information to a text-to-speech (TTS) engine. The TTS engine may then generate an actual audio file for outputting the audio data determined by the application (e.g., "okay," or "AR session started").

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 156 during runtime operations where NLU operations are performed on text (such as text output from an ASR component 154). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1063. Each recognizer may include various NLU components such as an NER component 1062, IC component 1064 and other components such as an entity resolver, or other components.

For example, a messaging domain recognizer 1063-A (Domain A) may have an NER component 1062-A that identifies what slots (i.e., portions of input text) may correspond to particular words relevant to that domain. The words may correspond to entities such as (for the messaging domain) a recipient. An NER component 1062 may use a machine learning model, such as a domain specific conditional random field (CRF) to both identify the portions corresponding to an entity as well as identify what type of entity corresponds to the text portion. The messaging domain recognizer 1063-A may also have its own intent classification (IC) component 1064-A that determines the intent of the text assuming that the text is within the proscribed domain. An IC component may use a model, such as a domain specific maximum entropy classifier to identify the intent of the text, where the intent is the action the user desires the system to perform. For this purpose, device 102(*a*)-(*d*) may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the system 104, as illustrated herein are exemplary, and may be located in a stand-alone device or may be included, in whole or in part, as a component of a larger device or system, may be distributed across a network or multiple devices connected by a network, etc.

Figure 11:
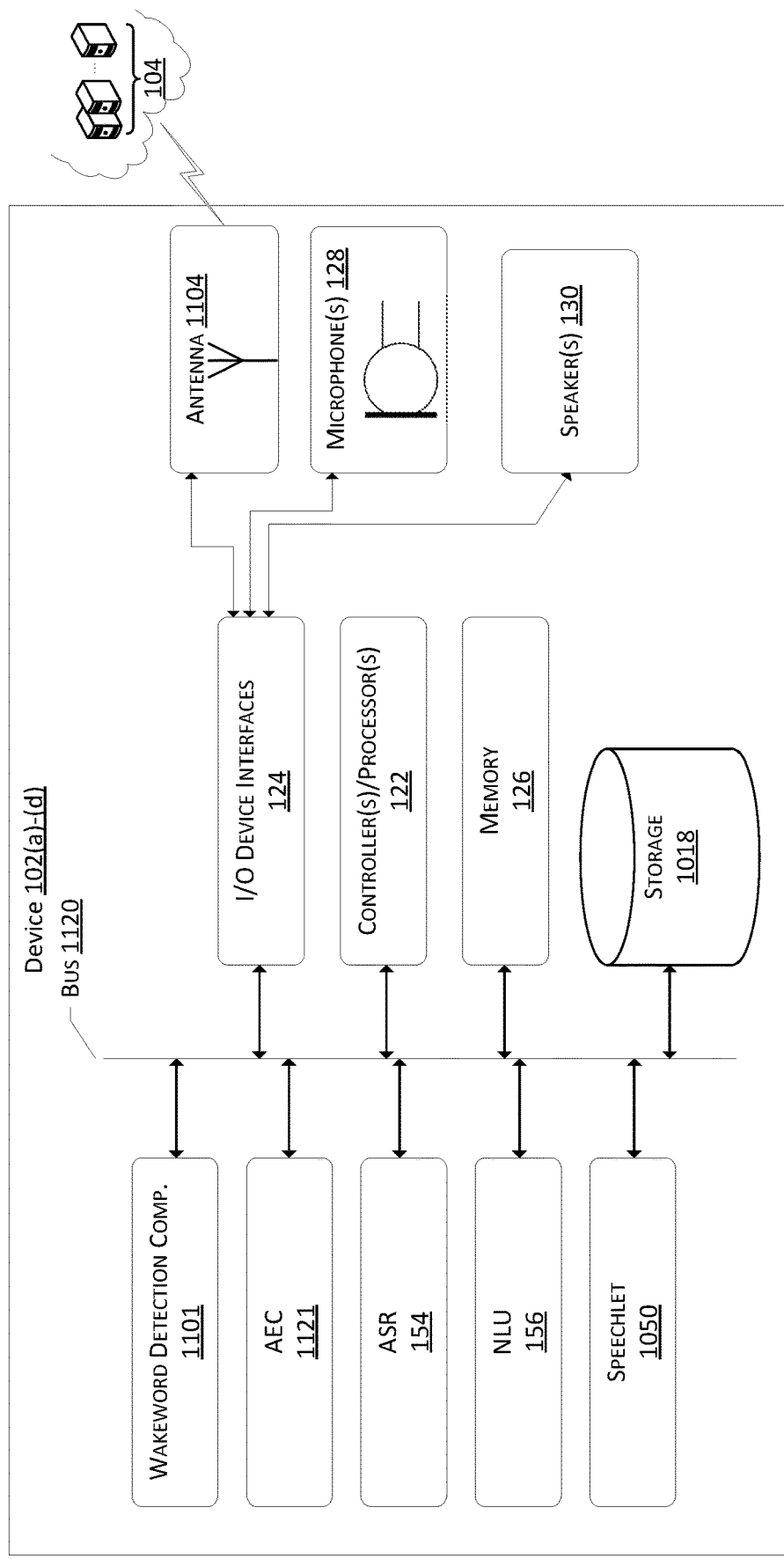
FIG. 11 illustrates a conceptual diagram of components of an example device that may be utilized in association with device integration in AR environments.

FIG. 11 illustrates a conceptual diagram of components of an example connected device from which sensor data may be received for device functionality control utilizing activity prediction. For example, the device may include one or more electronic devices such as voice interface devices (e.g., smart speaker devices, mobile phones, tablets, personal computers, etc.), video interface devices (e.g., televisions, set top boxes, virtual/augmented reality headsets, etc.), touch interface devices (tablets, phones, laptops, kiosks, billboard, etc.), and accessory devices (e.g., lights, plugs, locks, thermostats, appliances, televisions, clocks, smoke detectors, doorbells, cameras, motion/magnetic/other security-system sensors, etc.). These electronic devices may be situated in a home associated with the first user profile, in a place a business, healthcare facility (e.g., hospital, doctor's office, pharmacy, etc.), in vehicle (e.g., airplane, truck, car, bus, etc.) in a public forum (e.g., shopping center, store, etc.), for example. A second user profile may also be associated with one or more other electronic devices, which may be situated in home or other place associated with the second user profile, for example. The device 102(a)-(d) may be implemented as a standalone device that is relatively simple in terms of functional capabilities with limited input/output components, memory, and processing capabilities. For instance, the device 102(a)-(d) may not have a keyboard, keypad, touchscreen, or other form of mechanical input. In some instances, the device 102(a)-(d) may include a microphone 128, a power source, and functionality for sending generated audio data via one or more antennas 1104 to another device and/or system.

The device 102(a)-(d) may also be implemented as a more sophisticated computing device, such as a computing device similar to, or the same as, a smart phone or personal digital assistant. The device 102(a)-(d) may include a display with a touch interface and various buttons for providing input as well as additional functionality such as the ability to send and receive communications. Alternative implementations of the device 102(a)-(d) may also include configurations as a personal computer. The personal computer may include input devices such as a keyboard, a mouse, a touchscreen, and other hardware or functionality that is found on a desktop, notebook, netbook, or other personal computing devices. In examples, the device 102(a)-(d) may include an automobile, such as a car. In other examples, the device 102(a)-(d) may include a pin on a user's clothes or a phone on a user's person. In examples, the device 102(a)-(d) and may not include speaker(s) and may utilize speaker(s) of an external or peripheral device to output audio via the speaker(s) of the external/peripheral device. In this example, the device 102(a)-(d) might represent a set-top box (STB), and the device 102(a)-(d) may utilize speaker(s) of another device such as a television that is connected to the STB for output of audio via the external speakers. In other examples, the device 102(a)-(d) may not include the microphone(s) 128, and instead, the device 102(a)-(d) can utilize microphone(s) of an external or peripheral device to capture audio and/or generate audio data. In this example, the device 102(a)-(d) may utilize microphone(s) of a headset that is coupled (wired or wirelessly) to the device 102(a)-(d). These types of devices are provided by way of example and are not intended to be limiting, as the techniques described in this disclosure may be used in essentially any device that has an ability to recognize speech input or other types of natural language input.

The device 102(a)-(d) of FIG. 11 may include one or more controllers/processors 122, that may include a central processing unit (CPU) for processing data and computer-readable instructions, and memory 126 for storing data and instructions of the device 102(a)-(d). In examples, the skills and/or applications described herein may be stored in association with the memory 126, which may be queried for content and/or responses as described herein. The device 102(a)-(d) may also be connected to removable or external non-volatile memory and/or storage, such as a removable memory card, memory key drive, networked storage, etc., through input/output device interfaces 124.

Computer instructions for operating the device 102(a)-(d) and its various components may be executed by the device's controller(s)/processor(s) 122, using the memory 126 as "working" storage at runtime. A device's computer instructions may be stored in a non-transitory manner in non-volatile memory 126, storage 1118, or an external device(s). Alternatively, some or all of the executable instructions may be embedded in hardware or firmware on the device 102 (a)-(d) in addition to or instead of software.

The device 102(a)-(d) may include input/output device interfaces 124. A variety of components may be connected through the input/output device interfaces 124. Additionally, the device 102(a)-(d) may include an address/data bus 1120 for conveying data among components of the respective device. Each component within a device 102(a)-(d) may also be directly connected to other components in addition to, or instead of, being connected to other components across the bus 1120.

The device 102(a)-(d) may include a display, which may comprise a touch interface. Any suitable display technology, such as liquid crystal display (LCD), organic light emitting diode (OLED), electrophoretic, and so on, may be utilized for the displays. Furthermore, the processor(s) 122 may comprise graphics processors for driving animation and video output on the associated display. As a way of indicating to a user that a connection between another device has been opened, the device 102(a)-(d) may be configured with one or more visual indicators, such as the light element(s), which may be in the form of LED(s), that may change color, flash, or otherwise provide visible light output, such as for a notification indicator on the device 102(a)-(d). The input/output device interfaces 124 that connect to a variety of components. This wired or a wireless audio and/or video port may allow for input/output of audio/video to/from the device 102(a)-(d). The device 102(a)-(d) may also include an audio capture component. The audio capture component may be, for example, a microphone 128 or array of microphones, a wired headset or a wireless headset, etc. The microphone 128 may be configured to capture audio. If an array of microphones is included, approximate distance to a sound's point of origin may be determined using acoustic localization based on time and amplitude differences between sounds captured by different microphones of the array. The device 102(a)-(d) (using microphone 128, wakeword detection component 1101, ASR component 154, etc.) may be configured to generate audio data corresponding to captured audio. The device 102(a)-(d) (using input/output device interfaces 124, antenna 1104, etc.) may also be configured to transmit the audio data to the system 104 for further processing or to process the data using internal components such as a wakeword detection component 1001.

Via the antenna(s) 1104, the input/output device interface 124 may connect to one or more networks via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Universal Serial Bus (USB) connections may also be supported. Power may be provided to the device 102(a)-(d) via wired connection to an external alternating current (AC) outlet, and/or via onboard power sources, such as batteries, solar panels, etc.

Through the network(s), the system may be distributed across a networked environment. Accordingly, the device 102(a)-(d) and/or the system 104 may include an ASR component 154. The ASR component 154 of device 102(a)-(d) may be of limited or extended capabilities. The ASR component 154 may include language models stored in ASR model storage component, and an ASR component 154 that performs automatic speech recognition. If limited speech recognition is included, the ASR component 154 may be configured to identify a limited number of words, such as keywords detected by the device, whereas extended speech recognition may be configured to recognize a much larger range of words.

The device 102(a)-(d) and/or the system 104 may include a limited or extended NLU component 156. The NLU component 156 of device 102(a)-(d) may be of limited or extended capabilities. The NLU component 156 may comprise a name entity recognition module, an intent classification module and/or other components. The NLU component 156 may also include a stored knowledge base and/or entity library, or those storages may be separately located.

In examples, AEC may also be performed by the device 102(a)-(d). In these examples, the operations may include causing the AEC component 1121 to be enabled or otherwise turned on, or the operations may include causing the AEC component 1121 to transition from a first mode to a second mode representing a higher sensitivity to audio data generated by the microphone 128. The AEC component 1121 may utilize the audio data generated by the microphone 128 to determine if an audio fingerprint of the audio data, or portion thereof, corresponds to a reference audio fingerprint associated with the predefined event.

The device 102(a)-(d) and/or the system 104 may also include a speechlet 1050 that is configured to execute commands/functions associated with a spoken command as described herein. The device 102(a)-(d) may include a wakeword detection component 1001, which may be a separate component or may be included in an ASR component 154. The wakeword detection component 1001 receives audio signals and detects occurrences of a particular expression (such as a configured keyword) in the audio. This may include detecting a change in frequencies over a specific period of time where the change in frequencies results in a specific audio fingerprint that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102(a)-(d) may be configured collectively to identify a set of the directional audio signals in which the wake expression is detected or in which the wake expression is likely to have occurred.

Figure 12:
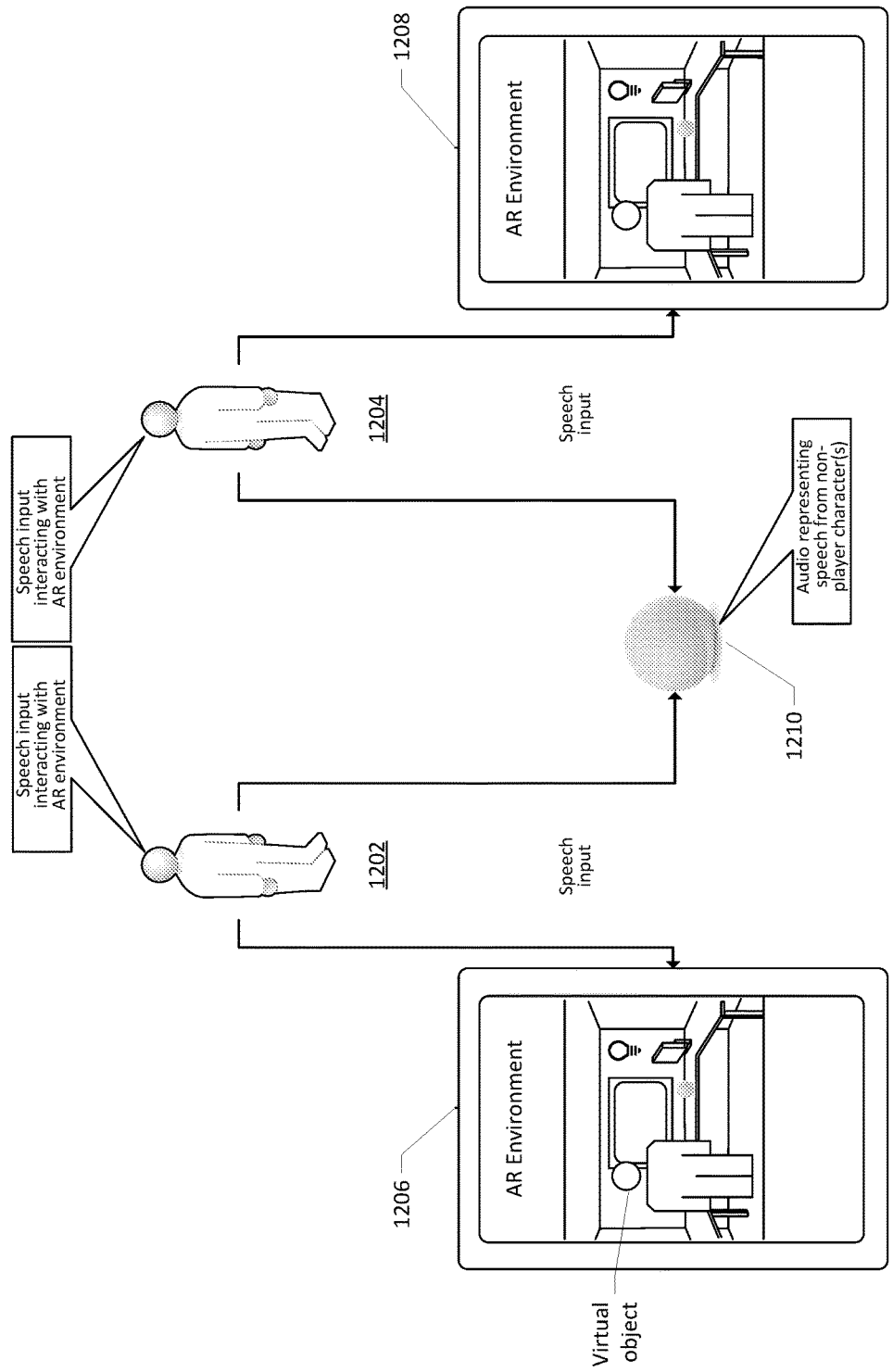
FIG. 12 illustrates a conceptual diagram of components and devices utilized to perform conversation arbitration during an AR session.

FIG. 12 illustrates a conceptual diagram of components and devices utilized to perform conversation arbitration during an AR session. The physical environment of FIG. 12 may include multiple physical users 1202, 1204 as well as multiple user devices 1206, 1208. The user devices 1206, 1208 may be the same or similar to the user devices 103 described with respect to FIG. 1. Additionally, the physical environment of FIG. 12 may include a speech interface device 1210, which may be the same or similar to one or more of the devices 102(a)-(d) described with respect to FIG. 1.

As shown in FIG. 12, the users 1202, 1204 may be engaged in an AR session where an AR environment is displayed on the user devices 1206, 1208. In this example, the user devices 1206, 1208 are both associated with the same AR session in the same physical environment, and as such the same AR environment is displayed on the user devices 1206, 1208. In this example, a virtual object is displayed in the AR environment, with the virtual object being a non-player character. In other examples, the virtual object may be a representation of any object that may make noise, such as a doorbell, a speaker, an appliance, etc. During the AR session, one or more of the users 1202, 1204 may provide speech input interacting the AR environment, such as asking the non-player character a question and/or answering a question from the non-player character. Audio representing the speech input may be received by multiple devices in the physical environment, including the user devices 1206, 1208 and the speech interface device 1210. These devices may communicate with each other and/or with a speech processing system to determine which device should provide a response to the speech input and/or which audio data should be utilized to determine a response to the speech input.

In one example, the speech input may be provided by the user 1202 associated with the user device 1206. Given that the user 1202 may be closer to the user device 1206 than the user device 1208 and/or the speech interface device 1210, characteristics of the speech input and/or the audio data generated therefrom may indicate that the user device 1206 is to be selected as the device closest to the source of the speech input. These characteristics may include received signal strength indicator (RSSI) data, signal-to-noise ratio data, etc. In this example, the system may determine that the user 1202 is the user that provided the speech input and may perform an action accordingly, such as generating a response that is personal to the user 1202. In addition to the above, speaker recognition techniques may be utilized to determine what speaker provided the speech input. In still other examples, the users 1202, 1204 may provide speech input at least partially at the same time. In these examples, the system may parse the audio data representing the speech input to segment which speech input is associated with which speaker. Thereafter, the system may determine multiple actions to be performed based on the multiple speech inputs and may cause one or more of the devices to perform those actions.

In the example of FIG. 12, the speech processing system may determine an audio response to certain speech input, where that audio response may be associated with the non-player character depicted in the AR environment. In certain examples, audio representing the response may be output on one or more of the user devices 1206, 1208, and the system may determine which of the devices to output the audio on based at least in part on the speaker that provided the speech input, the user device 1206, 1208 that was selected as described above, and/or other factors associated with the AR session. In other examples, as illustrated in FIG. 12, the speech interface device 1210 may output the audio. In these examples, the speech interface device 1210 may be one of multiple audio-output devices in the physical environment and may be selected as the device to output the audio based at least in part on a location of the speech interface device 1210 in relation to a location of the non-player character in the AR environment. By doing so, the audio may be output from a device that is in a location associated with the location of the non-player character.

Figure 13:
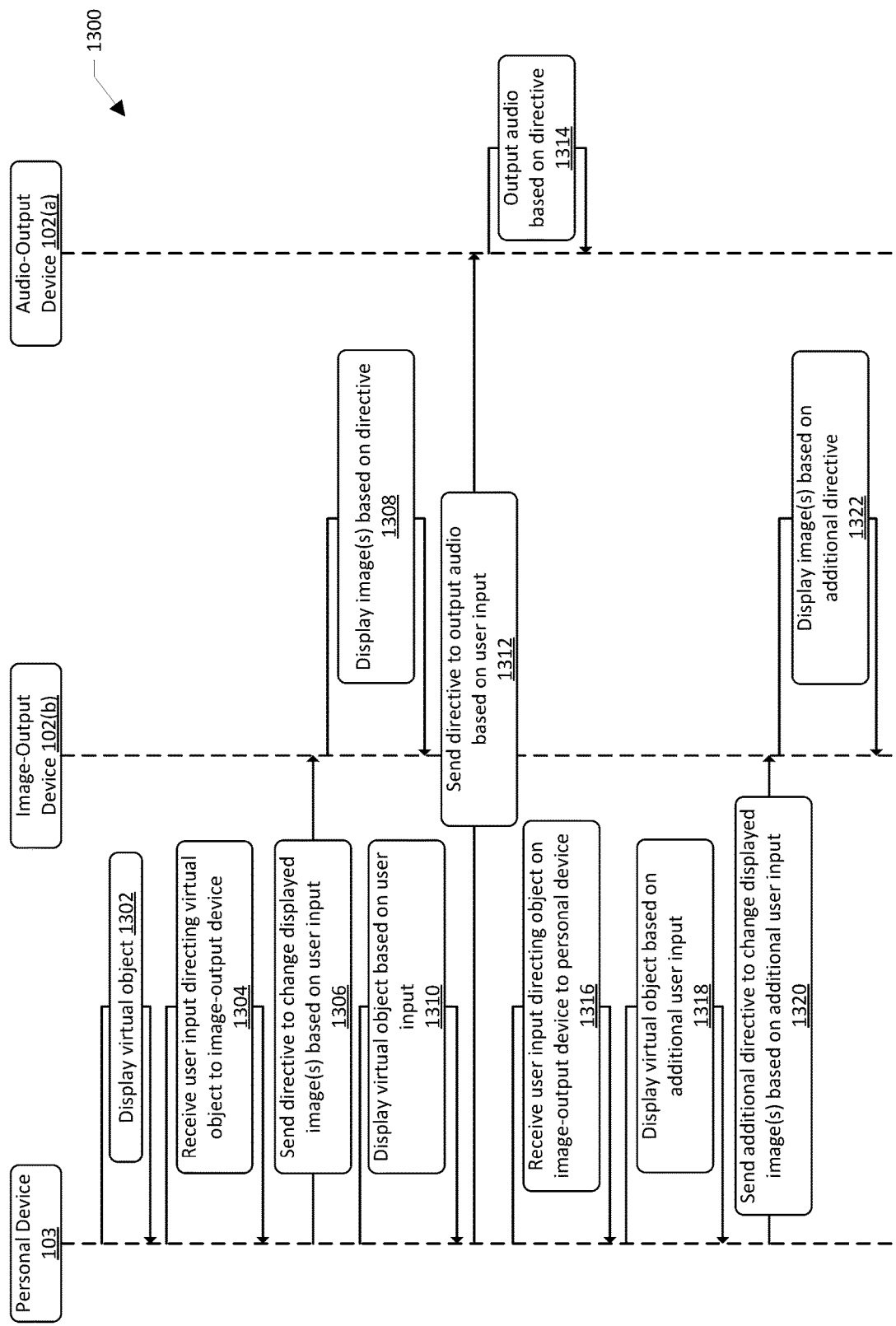
FIG. 13 illustrates a sequence diagram of an example process for causing image-output devices and an audio-output device to perform actions during an AR session based on user input.

FIG. 13 illustrates a sequence diagram of an example process 1300 for causing image-output devices and an audio-output device to perform actions during an AR session based on user input. FIG. 13 may include a user device, such as the user device 103 from FIG. 1, an image-output device, such as the image-output device 102(b) from FIG. 1, and/or an audio-output device, such as the audio-output device 102(a) from FIG. 1. It should be understood that the operations described with respect to FIG. 13 may be performed in any order and/or in parallel, and may not necessarily be performed in the order described with respect to FIG. 13.

At step 1302, the user device 103 may display a virtual object. In this example, an AR session is occurring and an AR environment associated with the AR session may be displayed on the user device 103. As part of the AR environment, a virtual object may be displayed, such as a virtual "rope." Additionally, in the physical environment where the user device 103 is situated, the image-output device 102(b) may be caused to display an image that includes an object representation. The object representation in this example may be a "key," and the object representation may be viewable both in the physical environment by a user looking at the image-output device 102(b) as well as in the AR environment by the user looking at a display of the user device 103 while a field of view of a camera of the user device 103 depicts the image-output device 102(b).

At step 1304, specific continuing interactions between the user device 103 and the device 102(b) may be possible given the techniques described herein. As an example, the user may provide user input to the user device 103 to "flick" the rope toward the physical location of the image-output device 102(b).

At step 1306, the user device 103 may send a directive to change the displayed image(s) on the image-output device 102(b) based at least in part on the user input. In this example, depending on the user input, the rope may "lasso" or otherwise interact with the object representation displayed on the image-output device 102(b).

At step 1308, the image-output device 102(b) may output image(s) based on the directive that was received from the user device 103 and/or from a remote device associated with the AR application at issue. For example, the image(s) may be displayed by the image-output device 102(b) such that it appears, to a user, that the virtual object from the user device 103 is "thrown" to the image-output device 102(b) and at least a portion of the virtual object is displayed with and/or interacts with object representations on the image-output device 102(b).

At step 1310, the user device 103 may display the virtual object based at least in part on the user input. In this example, in addition to causing display of different images on the image-output device 102(b), the user device 103 may also alter the AR environment displayed to the user to present the change caused by the user input. For example, the virtual rope may be partially thrown to the image-output device 102(b), but a portion of the rope may remain on the display of the user device 103. Images may be output on the user device 103 to present this change to the virtual object caused by the user input.

At step 1312, the user device 103 may send a directive to the audio-output device 102(a) to output audio based at least in part on the user input. In this example, the audio may be the sound of a rope being thrown, the rope hitting the virtual key on the image-output device 102(b), etc. In some examples, the directive sent to the audio-output device 102(a) may include audio data to be utilized by the audio-output device 102(a) to output the corresponding audio.

At step 1314, the audio-output device 102(a) may cause one or more speakers of the device 102(a) to output the audio. In examples, the audio may be output in time synchronization with display of the image(s) described with respect to step 1308. To do so, timing data may be sent and received at the audio-output device 102(a) that may cause the audio-output device 102(a) to output the audio at a directed time.

At step 1316, the user device 103 may receive additional user input directing the object on the image-output device 102(b) to the user device 103. In this example, the user input to the user device 103 may be to "pull" the rope back to the user device 103.

At step 1318, the user device 103 may display the virtual object based at least in part on the additional user input. In this example, the AR environment may be changed while the user input is received to reflect that virtual object being pulled back to the user device 103 from the image-output device 102(b).

At step 1320, the user device 103 may send additional directive(s) to change the displayed image(s) on the image-output device 102(b) based at least in part on the additional user input. In this example, in addition to changing the AR environment to reflect the rope being pulled back to the user device 103 from the image-output device 102(b), concurrently the image-output device 102(b) may be sent directives to change display of the virtual object and the object representations displayed on the image-output device 102(b).

At step 1322, the image-output device 102(b) may display the image(s) based at least in part on the additional directive(s) from the user device 103 and/or from a remote device associated with the AR application at issue. By so doing, the AR environment as displayed on the user device 103 is changed at the same or a similar time as the images on the image-output device 102(b) are caused to change. This may result in the user perceiving the user interaction to the AR session causing the user device 103 and the image-output device 102(b) to both be updated.

It should be understood that while FIG. 13 deals with a user device 103 and two other devices, more than two other devices may be involved in the processes described with respect to FIG. 13 and/or an intermediary device may be utilized to communicate between the user device 103 and the other devices at issue.

Figure 14:
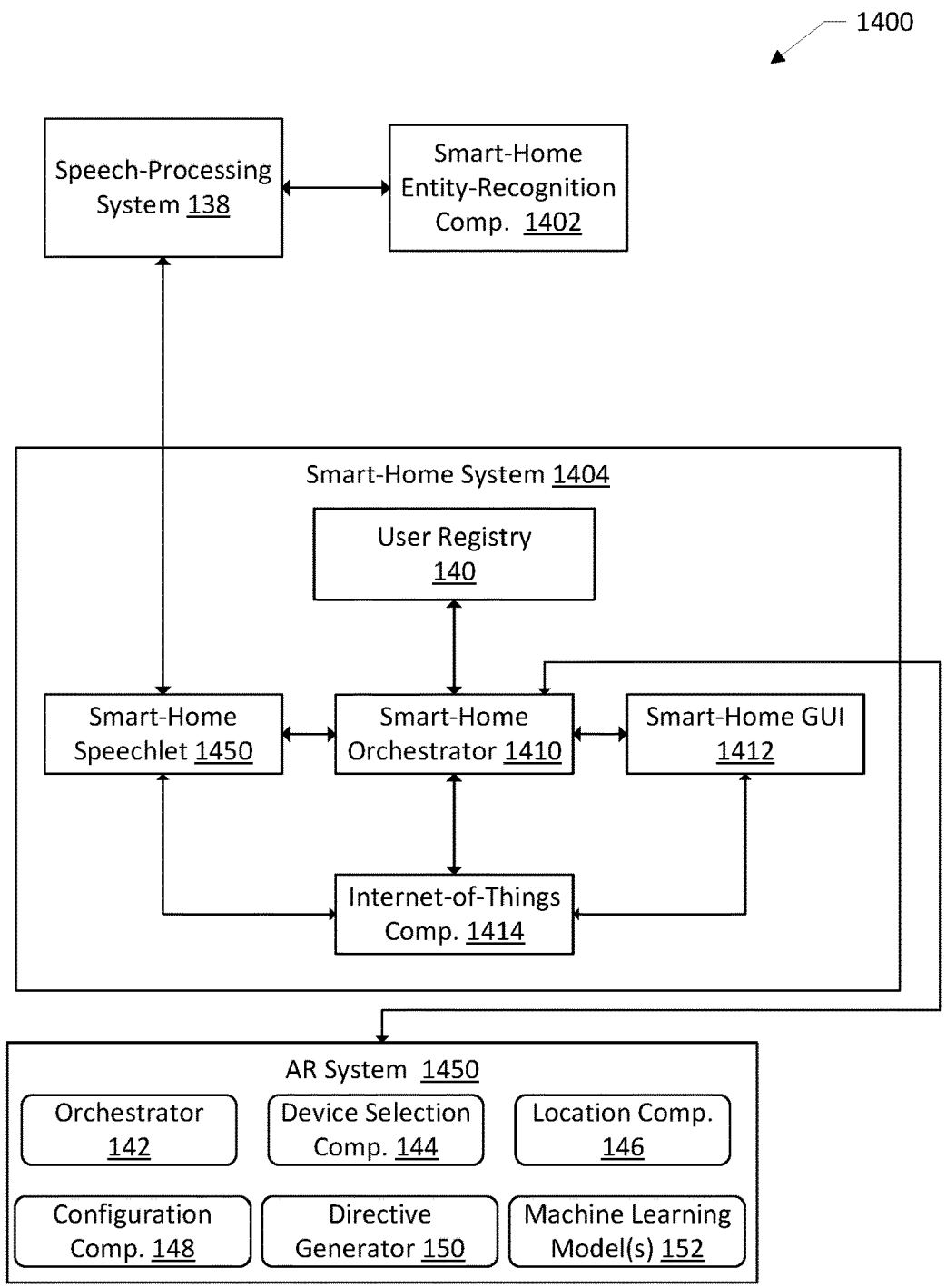
FIG. 14 illustrates a conceptual diagram of components utilized in an example smart home system.

FIG. 14 illustrates a conceptual diagram of example components of a smart-home system that may be utilized for device integration with AR environments. The smart-home system 1404 may include components described above with respect to FIG. 1. The smart-home system 1404 may also be configured to send data to and receive data from other components of a system and/or one or more other systems, such as an AR system 1450. For example, the other components may include a speech processing system 138. The smart-home system 1404 may also include components such as a smart-home orchestrator 1410, a smart-home graphical user interface (GUI) 1412, and/or an internet-of-things component 1414. Each of these components will be described in detail below.

As described herein, a user may interact with a smart device using tactile input to the smart device, voice input to a voice-controlled device, and/or input to an application residing on and/or accessible to a personal device. When a user interacts with a smart device using voice input to a voice-controlled device, audio data representing user utterances may be received at the speech processing system 138. The speech processing system 138 may analyze the audio data and/or corresponding text data generated, by way of example, using an ASR component, to determine that the user utterance represents an intent to control a smart device. To determine the intent associated with the user utterance, the speech processing system 138 may utilize a smart-home entity-recognition component 1402, which may be utilized to inform one or more intents available to the speech processing system 138 and/or to inform one or more values associated with the intents. For example, the user utterance of "turn off bedroom lights" may be analyzed by the speech processing system 138. The smart-home entity-recognition component 1402 may train or otherwise provide data to the speech processing system 138 indicating intents associated with operation of smart devices, such as "turn on," "turn off," "activate," "deactivate," "dim," "brighten," "lock," "unlock," etc. The smart-home entity-recognition component 1402 may additionally, or alternatively, provide data indicating identifiers and/or payloads associated with such intents, such as "light," "lights," "lock," "outlet," "switch," etc. It should be understood that while the smart-home entity-recognition component 1402 is depicted in FIG. 14 as being a component separate from the smart-home system 1404, the smart-home entity-recognition component 1402 may be a component of the smart-home system 1404.

The speech processing system 138 may be configured to determine that the intent corresponds to an operation configured to be performed by the smart-home system 1404, and based at least in part on such a determination, the speech processing system 138 may provide the intent data and/or other data associated with the request to the smart-home speechlet 1450 of the smart-home system 1404. The smart-home orchestrator 1410 may be configured to receive data indicating that the smart-home speechlet 1450 has been invoked to determine a directive to be performed with respect to a smart device and may query one or more other components of the smart-home system 1404 to effectuate the request. For example, the smart-home orchestrator 1410 may query the internet-of-things component 1414 to identify naming indicators associated with smart devices for a particular user account. The internet-of-things component 1414 may query data store(s) and/or the user registry 140 and/or the user account for such naming indicators.

In other examples, such as when the smart-home speechlet 1450 receives a request to discover a smart device, such as from a smart-device system, the smart-home orchestrator 1410 may query one or more components of the smart-home system 1404 to determine associations between smart device identifiers and user account identifiers as described herein. Additionally, or alternatively, as mentioned above, the smart devices may be operated based at least in part on input data received from an application residing on and/or accessible to a personal device, such as a mobile phone and/or computer. The smart-home GUI 1412 may be utilized to receive the input data and/or to display recommendations and/or requests to a user. For example, the smart-home GUI 1412 may be utilized to display a request to confirm that a selected smart device is the desired device to be acted upon.

Additionally, as described herein above, one or more component of the AR system 1450 may be utilized to determine what devices to configure to be utilized for a given AR application in a given physical environment. The result of this process may be configuration data that enables the AR application to control smart home devices based on events that occur in association with an AR environment associated with the AR application. When such events occur, the AR system 1450 may send an indication of what smart home device is to be controlled and how that smart home device is to be controlled based at least in part on the event(s) occurring. The smart-home orchestrator 1410 may receive requests to operate the smart home devices and may query the internet-of-things component 1414 to determine what device(s) to perform an operation on. Directive data may be generated and sent from the smart-home system 1404 to the device at issue to cause a device state change to occur in response to the directive data.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A method, comprising:
receiving first data indicating a request to initiate an application on a first device;
determining, utilizing second data indicating distances between the first device and other devices in a physical environment of the first device, a reference device that is proximate to the first device;
determining, based at least in part on prior interaction information from user account data, that the reference device is historically utilized in association with the other devices;
based at least in part on the reference device being historically utilized in association with the other devices, selecting the other devices, wherein the application that sent the request is configured to present an augmented reality (AR) environment;
determining location data indicating a location of a second device of the other devices in the physical environment;
identifying a location in the AR environment that corresponds to the location of the second device in the physical environment; and
sending, to the application, configuration data that enables the application to present a user interface for state changes of the second device in association with an event occurring at the location in the AR environment.

2. The method of claim 1, further comprising:
receiving, from the application, an indication of the event occurring in the AR environment, the event associated with the location of the second device in the physical environment; and
sending a directive to the second device based at least in part on receiving the indication, the directive causing the second device to transition from a first state to a second state such that the second device operates in the second state in the physical environment; and
wherein a representation of the second state of the second device is presented in the AR environment based at least in part on the location of the second device in the physical environment being within a field of view of a camera of the first device.

3. The method of claim 1, further comprising:
determining, based at least in part on device types that the application has been configured to interact with, that at least one device having a device type of the device types is unassociated with the physical environment but is associated with user account data of the first device; and
causing the at least one device to be included in the other devices.

4. The method of claim 1, further comprising:
receiving, from the application, user input data indicating a selection of a functionality of multiple functionalities associated with the AR environment; and causing at least one device of the other devices to be removed from the other devices based at least in part on the user input data.

5. The method of claim 1, further comprising:
receiving, from the first device, first image data representing a first image of the second device within a field of view of a camera of the first device;
identifying, utilizing computer vision techniques, a second image being depicted on the second device; and
causing a third image to be displayed on the first device in association with the AR environment based at least in part on the second image being depicted on the second device.

6. The method of claim 1, further comprising:
receiving, from the first device, first image data corresponding to a field of view of a camera of the first device;
identifying, utilizing computer vision processing, the second device as depicted in the first image data;
sending, to the application, an indication that the second device is being viewed by the first device in association with the AR environment;
receiving, from the application, second image data to be displayed on the second device while the second device is being viewed by the first device in association with the AR environment; and
sending a directive to the second device, the directive configured to cause the second device to display an image corresponding to the second image data while the second device is being viewed by the first device in association with the AR environment.

7. The method of claim 1, further comprising:
receiving, from the application, user input data indicating a user interaction with the first device to cause a virtual object displayed in the AR environment to be displayed on the second device;
receiving, from the application, image data corresponding to the virtual object;
receiving, from the application, audio data associated with the virtual object;
sending a first directive to the second device, the first directive causing the virtual object to be displayed on a screen of the second device based at least in part on the user input data; and
sending a second directive to the second device, the second directive causing audio corresponding to the audio data to be output by a speaker of the second device.

8. The method of claim 1, wherein identifying the other devices is based at least in part on an identified proximity of the other devices to the first device when the first data was received.

9. The method of claim 1, wherein the configuration data enables the application to control functionality of the second device in response to the event occurring in association with the location within the AR environment.

10. The method of claim 1, wherein the configuration data enables the application to control functionality of the second device in response to a field of view of a camera of the first device capturing an image of the second device.

11. A system, comprising:
one or more processors; and
non-transitory computer-readable media storing computer-executable instructions that, when executed by the one or more processors, cause the one or more processors to perform operations comprising:
receiving first data indicating a request to initiate an application on a first device;
determining, utilizing second data indicating distances between the first device and other devices in a physical environment of the first device, a reference device that is proximate to the first device;
determining, based at least in part on prior interaction information from user account data, that the reference device is historically utilized in association with the other devices;
based at least in part on the reference device being historically utilized in association with the other devices, selecting the other devices, wherein the application that sent the request is configured to present an augmented reality (AR) environment;
determining location data indicating a location of a second device of the other devices in the physical environment;
identifying a location in the AR environment that corresponds to the location of the second device in the physical environment; and
sending, to the application, configuration data that enables the application to present a user interface for state changes of the second device in association with an event occurring at the location in the AR environment.

12. The system of claim 11, the operations further comprising:
receiving, from the application, an indication of the event occurring in the AR environment, the event associated with the location of the second device in the physical environment; and
sending a directive to the second device based at least in part on receiving the indication, the directive causing the second device to transition from a first state to a second state such that the second device operates in the second state in the physical environment; and
wherein a representation of the second state of the second device is presented in the AR environment based at least in part on the location of the second device in the physical environment being within a field of view of a camera of the first device.

13. The system of claim 11, the operations further comprising:
determining, based at least in part on device types that the application has been configured to interact with, that at least one device having a device type of the device types is unassociated with the physical environment but is associated with user account data of the first device; and
causing the at least one device to be included in the other devices.

14. The system of claim 11, the operations further comprising:
receiving, from the application, user input data indicating a selection of a functionality of multiple functionalities associated with the AR environment; and
causing at least one device of the other devices to be removed from the other devices based at least in part on the user input data.

15. The system of claim 11, the operations further comprising:
receiving, from the first device, first image data representing a first image of the second device within a field of view of a camera of the first device;
identifying, utilizing computer vision techniques, a second image being depicted on the second device; and causing a third image to be displayed on the first device in association with the AR environment based at least in part on the second image being depicted on the second device.

16. The system of claim 11, the operations further comprising:
receiving, from the first device, first image data corresponding to a field of view of a camera of the first device;
identifying, utilizing computer vision processing, the second device as depicted in the first image data;
sending, to the application, an indication that the second device is being viewed by the first device in association with the AR environment;
receiving, from the application, second image data to be displayed on the second device while the second device is being viewed by the first device in association with the AR environment; and
sending a directive to the second device, the directive configured to cause the second device to display an image corresponding to the second image data while the second device is being viewed by the first device in association with the AR environment.

17. The system of claim 11, the operations further comprising:
receiving, from the application, user input data indicating a user interaction with the first device to cause a virtual object displayed in the AR environment to be displayed on the second device;
receiving, from the application, image data corresponding to the virtual object;
receiving, from the application, audio data associated with the virtual object;
sending a first directive to the second device, the first directive causing the virtual object to be displayed on a screen of the second device based at least in part on the user input data; and
sending a second directive to the second device, the second directive causing audio corresponding to the audio data to be output by a speaker of the second device.

18. The system of claim 11, wherein identifying the other devices is based at least in part on an identified proximity of the other devices to the first device when the first data was received.

19. The system of claim 11, wherein the configuration data enables the application to control functionality of the second device in response to the event occurring in association with the location within the AR environment.

20. The system of claim 11, wherein the configuration data enables the application to control functionality of the second device in response to a field of view of a camera of the first device capturing an image of the second device.

* * * * *